(12) United States Patent
Nooren et al.

(10) Patent No.: US 9,926,630 B2
(45) Date of Patent: Mar. 27, 2018

(54) PROCESS FOR THE PROTECTION AGAINST CORROSION OF AN ARTICLE IN A WET ENVIRONMENT AND COMPOSITION THEREFORE

(71) Applicant: Frans Nooren Afdichtingssystemen B.V., Stadskanaal (NL)

(72) Inventors: Franciscus Petrus Marie Nooren, Stadskanaal (NL); Jan Frederik Doddema, Stadskanaal (NL); Hindrik Harm Broesder, Stadskanaal (NL)

(73) Assignee: FRANS NOOREN AFDICHTINGSSYSTEMEN B.V., Stadskanaal (NL)

( * ) Notice: Subject to any disclaimer, the term of this patent is extended or adjusted under 35 U.S.C. 154(b) by 293 days.

(21) Appl. No.: 14/414,418

(22) PCT Filed: Jul. 12, 2013

(86) PCT No.: PCT/NL2013/050532
§ 371 (c)(1),
(2) Date: Jan. 12, 2015

(87) PCT Pub. No.: WO2014/011051
PCT Pub. Date: Jan. 16, 2014

(65) Prior Publication Data
US 2015/0259805 A1    Sep. 17, 2015

Related U.S. Application Data

(60) Provisional application No. 61/671,155, filed on Jul. 13, 2012.

(30) Foreign Application Priority Data

Jul. 13, 2012 (EP) .................................. 12176335

(51) Int. Cl.
*C23F 11/173* (2006.01)
*C09D 5/08* (2006.01)
*C08K 3/34* (2006.01)
*B32B 5/02* (2006.01)
*B32B 7/06* (2006.01)
*B32B 27/12* (2006.01)
*B32B 27/22* (2006.01)
*C09K 15/04* (2006.01)

(52) U.S. Cl.
CPC ............ *C23F 11/173* (2013.01); *B32B 5/022* (2013.01); *B32B 5/024* (2013.01); *B32B 5/026* (2013.01); *B32B 7/06* (2013.01); *B32B 27/12* (2013.01); *B32B 27/22* (2013.01); *C08K 3/34* (2013.01); *C09D 5/08* (2013.01); *C09K 15/04* (2013.01); *B32B 2260/021* (2013.01); *B32B 2260/046* (2013.01); *B32B 2262/0238* (2013.01); *B32B 2262/0276* (2013.01); *B32B 2262/0292* (2013.01); *B32B 2307/702* (2013.01); *B32B 2307/714* (2013.01); *B32B 2307/726* (2013.01); *Y10T 428/31692* (2015.04)

(58) Field of Classification Search
CPC ...................................................... C23F 11/173
USPC ........................................................ 428/323
See application file for complete search history.

(56) References Cited

U.S. PATENT DOCUMENTS

| | | | |
|---|---|---|---|
| 3,751,275 A * | 8/1973 | Oken | ...................... C04B 24/42 |
| | | | 106/640 |
| 4,070,746 A | 1/1978 | Evans et al. | |
| 4,268,334 A | 5/1981 | Harris et al. | |
| 4,287,034 A | 9/1981 | Pieslak et al. | |
| 4,472,468 A | 9/1984 | Tailor et al. | |
| 4,497,926 A | 2/1985 | Toy | |
| 4,558,875 A | 12/1985 | Yamaji et al. | |
| 4,690,958 A | 9/1987 | Lacoste et al. | |

(Continued)

FOREIGN PATENT DOCUMENTS

| CA | 2308802 A1 | 11/2001 |
|---|---|---|
| CN | 1749343 | 3/2006 |

(Continued)

OTHER PUBLICATIONS

"Adhesives and Sealants in Buildings," Building Research Institute, Pub. 577, Wash. D.C., 1958, pp. 14-18, 23-26, and 78-82.
BASF Technical Information sheet, "Permanently Plastic Sealants based on Oppanol B," May 1974, 3 pages.
BASF Technical Information, "Oppanol B 100, Oppanol B 150, Oppanol B 200," edit. TI/ES 1417 us, Apr. 2003, pp. 1-10.
BASF Technical Information, "Oppanol B types—Oppanol B 10 SFN, Oppanol B 11 SFN, Oppanol B 12 SFN, Oppanol B 13 SFN, Oppanol B 15 SFN" edit. TI/ES 1482 us, Sep. 2003, pp. 1-8.
BASF Technical Information, "Oppanol B types—Oppanol B 30 SF, Oppanol B 50 / B 50 SF, Oppanol B 80;" edit. TI/ES 1415 us, Apr. 2003; pp. 1-11.

(Continued)

*Primary Examiner* — Doris L Lee
(74) *Attorney, Agent, or Firm* — Gilberto M. Villacorta; Sunit Talapatra; Foley & Lardner LLP

(57) ABSTRACT

The present invention relates to a process for the protection against corrosion of an article, comprising the steps of (a) application of a layer of a corrosion protecting composition comprising (i) an amorphous polymer composition comprising an amorphous polymer having a glass transition temperature of −20° C. or less and (ii) a water-absorbing filler, on a surface of the article, and (b) application of a mechanical protective layer on top of the layer of said corrosion protecting composition, wherein the article is in a wet environment. The invention further relates to a corrosion protecting composition and to a tape comprising a layer comprising a corrosion protecting composition according to the invention. The invention also relates to an article, comprising (a) a layer of a corrosion protecting composition according to the invention on a surface of the article, and (b) a mechanical protective layer to protect said layer of said composition.

19 Claims, No Drawings

(56) References Cited

U.S. PATENT DOCUMENTS

| | | |
|---|---|---|
| 4,713,133 A | 12/1987 | Kent |
| 4,732,412 A | 3/1988 | Van Der Linden et al. |
| 4,892,410 A | 1/1990 | Snow et al. |
| 5,049,005 A | 9/1991 | Lazare et al. |
| 5,226,751 A | 7/1993 | Doleshal |
| 5,348,801 A | 9/1994 | Venzi et al. |
| 5,362,572 A | 11/1994 | Hamada et al. |
| 5,445,848 A | 8/1995 | Venzi et al. |
| 5,462,780 A | 10/1995 | Richards |
| 5,464,886 A | 11/1995 | Tran et al. |
| 5,591,265 A | 1/1997 | Tusch |
| 5,621,025 A | 4/1997 | Toerner et al. |
| 5,663,230 A | 9/1997 | Haman |
| 5,817,413 A | 10/1998 | Huddleston et al. |
| 5,898,044 A | 4/1999 | Nooren |
| 6,033,776 A | 3/2000 | Huddleston et al. |
| 6,172,014 B1 | 1/2001 | Meyers |
| 6,274,235 B1 | 8/2001 | Ichimura et al. |
| 6,297,324 B1 | 10/2001 | Briddell et al. |
| 6,355,318 B1 | 3/2002 | Tailor et al. |
| 6,465,547 B1 | 10/2002 | Jackson et al. |
| 6,569,915 B1 | 5/2003 | Jackson et al. |
| 6,569,927 B1 | 5/2003 | Gelbin |
| 6,589,346 B2 | 7/2003 | Schick et al. |
| 6,683,126 B2 | 1/2004 | Keller et al. |
| 6,794,453 B2 | 9/2004 | Jackson et al. |
| 6,930,151 B2 | 8/2005 | Kennedy et al. |
| 7,056,844 B2 | 6/2006 | Sheely |
| 7,361,384 B2 | 4/2008 | Mamish |
| 7,608,343 B2 | 10/2009 | Nooren |
| 7,887,825 B2 | 2/2011 | Weichold et al. |
| 7,887,925 B2 | 2/2011 | Nooren |
| 8,105,963 B2 | 1/2012 | Nooren |
| 2003/0114056 A1 | 6/2003 | Sheely |
| 2003/0195287 A1 | 10/2003 | Fisher |
| 2003/0198763 A1 | 10/2003 | Bicakci-Jenkins et al. |
| 2004/0028862 A1 | 2/2004 | Burwell et al. |
| 2004/0127606 A1* | 7/2004 | Goodwin .............. C04B 24/163 524/2 |
| 2004/0191515 A1 | 9/2004 | Mullen |
| 2004/0266936 A1 | 12/2004 | Gipson |
| 2005/0043468 A1 | 2/2005 | Fisher |
| 2005/0234184 A1 | 10/2005 | Doring et al. |
| 2006/0175578 A1* | 8/2006 | Nooren .................. B32B 27/08 252/393 |
| 2006/0182950 A1 | 8/2006 | Yun et al. |
| 2006/0201102 A1 | 9/2006 | Shah |
| 2010/0051199 A1 | 3/2010 | Nooren |

FOREIGN PATENT DOCUMENTS

| | | |
|---|---|---|
| DE | 21 00 478 | 11/1971 |
| DE | 201 19 209 U1 | 4/2002 |
| EP | 0 797 02 B1 | 5/1986 |
| EP | 0 232 936 A2 | 8/1987 |
| EP | 0 244 738 A2 | 11/1987 |
| EP | 0 574 060 | 12/1993 |
| EP | 0 751 198 A | 1/1997 |
| EP | 0 751 198 B1 | 1/1997 |
| EP | 0 826 817 | 3/1998 |
| EP | 1 086 963 A | 3/2001 |
| EP | 1 644 433 | 4/2006 |
| EP | 2 204 427 A1 | 7/2010 |
| JP | 54-120644 | 9/1979 |
| JP | 58-003827 | 1/1983 |
| JP | 09-221649 | 8/1997 |
| SU | 747870 | 7/1980 |
| WO | WO-94/12581 A1 | 6/1994 |
| WO | WO-94/22598 | 10/1994 |
| WO | WO-95/24433 A1 | 9/1995 |
| WO | WO-96/28683 A1 | 9/1996 |
| WO | WO-99/14282 | 3/1999 |
| WO | WO-99/23186 | 5/1999 |
| WO | WO-99/48997 A1 | 9/1999 |
| WO | WO-99/56055 A1 | 11/1999 |
| WO | WO-00/52381 A1 | 9/2000 |
| WO | WO-01/70869 A2 | 9/2001 |
| WO | WO-02/31038 A1 | 4/2002 |
| WO | WO-02/066551 A1 | 8/2002 |
| WO | WO-03/089537 | 10/2003 |
| WO | WO-2004/009654 A1 | 1/2004 |
| WO | WO 2005-005528 * | 1/2005 |
| WO | WO-2005/005528 A1 | 1/2005 |
| WO | WO-2006/045423 A1 | 5/2006 |
| WO | WO-20061045422 | 5/2006 |
| WO | WO-20081056979 A3 | 5/2008 |

OTHER PUBLICATIONS

Belkin et al, "Plastics in Armor materiel,Chapter 2: Prospective Plastics for Armor Applications; Chapter 4: Applications of Plactics in Servicing and Repair of Armor Materiel," U.S. Army Foreing Science and Technology Center Report: FSTC-HT-23/1105-71, Jul. 21, 1971, p. 3.

BP Indopol Polybutenes—Delivering Value Through Versatility (Aug. 2001).

English translation of D.A. Kardashow et al., "Synthetic Adhesives," Moscow 1968, pp. 284, 285 and 347-352.

EPA High Production Volume Program, (revised) Test Plan for Irganox 1330/Ethanox 330, CAS No. 1709-70-2, Nov. 14, 2006.

Higgins et al.; "Butyl Rubber and Polyisobutylene in Adhesives and Sealants," Reprint from Handbook of Adhesives; 3rd Ed., 1990, pp. 1-21.

International Search Report of PCT/NL2013/050532 dated Oct. 4, 2013.

International Search Report, PCT/NL2007/050542 dated Aug. 12, 2008.

International Search Report, PCT/NL2004/000510, dated Oct. 13, 2004.

Kessel, BASF News Release, PIBinside "Oppanol—A bandage against rust," Mar. 22, 2007.

Marsalko et al., "Just Add PIBs—Polyisobutylenes are a vital part of adhesive and sealant formulations," Adhesives & Sealants Industry (ASI), PIB Profile, As Seen in the May Issue, (May 1, 2005).

Peyser, "Glass Transition Temperatures of Polymers," Polymer Handbook, 3rd ed., 1989, pp. VI/209, VI/214.

Product information for Ethanox® 702 Antioxidant, Albemarle Corporation, 2000.

Product information for Irganox® 1010 (Phenolic Primary Antioxidant for Processing and Long-Term Thermal Stabilization) , Ciba Specialty Chemicals Inc., 1998.

Search Report dated Oct. 18, 2010 in European Application No. 10155938.3.

Stopaq Europe—News, excerpt archived in 2007, www.web.archive.org/web/20070602031827/www.stopaq.com/en.

Wikipedia, "Glass transition," Sep. 12, 2010, 10 pages, found at www.en.wikipedia.org/wiki/Glass-transition.

Wikipedia, "Heat-shrink tubing," Sep. 12, 2010, 3 pages, found at www.en.wikipedia.org/wiki/Heat-shrink_tubing.

Willenbacher et al., "Polyisobutene-Based Pressure-Sentive Adhesives," Handbook of Pressure-Sensitive Adhesives and Products, 2003, Chapter 4, pp. 4.1-4.2.

Wu, "Surface and Interfacial Tensions of Polymers, Oligomers, Plasticizers, and Organic Pigments," Polymer Handbook, 3rd ed., 1989, pp. VI 411-414.

Young et al, "Polyisobutylene Tank Lining," Industrial and Engineering Chemistry (Jul. 1945) pp. 675-678.

* cited by examiner

PROCESS FOR THE PROTECTION AGAINST CORROSION OF AN ARTICLE IN A WET ENVIRONMENT AND COMPOSITION THEREFORE

CROSS REFERENCE TO RELATED APPLICATIONS

The present application is a National Stage of International Application No. PCT/NL2013/050532, filed Jul. 12, 2013, which claims priority to European Application No. 12176335.3 and U.S. Provisional Application No. 61/671, 155, both filed Jul. 13, 2012. The contents of these applications are herein incorporated by reference in their entirety.

FIELD OF THE INVENTION

The present invention relates to a process for the protection of an article whereby the article is in a wet environment. The invention particularly relates to the protection against corrosion of an article in a wet environment, in particular oil or gas pipes or lines and risers of oil drilling and production rigs and platforms.

BACKGROUND OF THE INVENTION

Articles in a wet environment, such as for example sweating pipelines, submerged oil lines or pipes, gas lines or pipes, and risers of drilling and production rigs or platforms are subject to corrosion or deterioration above, at and below the water line. These articles may be subject to deterioration or damage by salt water, corrosive pollution, cycles of wetting and drying, cycles of freezing and thawing and electrolysis. Erosion, marine organisms, mechanical impact, water content and abrasion may also cause premature failures of even properly designed articles. It is therefore necessary to protect such articles against damage or deterioration.

Corrosion is not only a problem with metal articles in a wet environment, but for example concrete articles may also be damaged by corrosion. Concrete may absorb water from the wet environment, resulting in corrosion of the (metal) reinforcement that is present in the concrete.

The anticorrosion treatments which have been carried out hitherto use quasi-manual techniques. The most widely practiced solution in fact consists in utilizing the services of divers, who, under several meters or tens of meters of water, manually coat the elements to be treated with, for example, paints, resins or mastics. Such techniques, practiced under difficult conditions, are very expensive, hazardous, and often rather unsatisfactory in terms of their effectiveness.

In addition to the adverse effects due to corrosion, submerged articles suffer the consequences of various mechanical stresses such as, for example, gravity, the repeated impact of the waves, the pressure of underwater currents or the traction on anchorage points. Offshore drilling and production platforms, in particular the risers, are relatively sensitive structures in this respect, by virtue of both their construction and their exposure to the natural elements.

In the prior art methods for anti-corrosion protection of structures in a marine environment and/or partly or wholly submerged structures are known wherein an encasing is used in combination with a corrosion inhibiting substance such as a curable polymer composition. Reference is for example made to U.S. Pat. No. 4,892,410, U.S. Pat. No. 5,049,005, U.S. Pat. No. 5,226,751 and U.S. Pat. No. 5,591,265, all incorporated by reference herein.

U.S. Pat. No. 4,892,410 discloses a jacket construction wherein a curable two-component polymer composition is injected and after which the polymer composition is cured. The polymer composition may for example be an epoxy resin.

U.S. Pat. No. 5,049,005 discloses a device for protecting branch girder joints against corrosion, said device comprising an elastic polymerized material such as for example an epoxy resin or a polyurethane.

U.S. Pat. No. 5,226,751 discloses a process wherein a jacket is placed around a pile which is then injected with air and preheated gas to dry the pile. In a subsequent step, the jacket is filled with an expanding closed cell form formed from liquid chemicals or epoxy resins.

U.S. Pat. No. 5,591,265 discloses a formwork, preferably comprising a tubular elongated member, wherein a curable resin material is injected between the annular space that is present between the metal article to be protected and the wall of the formwork.

The disadvantage of methods such as disclosed in U.S. Pat. No. 4,892,410, U.S. Pat. No. 5,049,005, U.S. Pat. No. 5,226,751 and U.S. Pat. No. 5,591,265 is that cured, rigid polymer compositions are used which generally have poor adhesion properties to the surface of the metal article. Moreover, such cured, rigid polymer compositions provide a hard seal that may split or tear under the influence of mechanical stress, e.g. wave actions. Another disadvantage of these materials is that volatile solvents are required when such materials are applied, said solvents being known as unfriendly to the environment. Additionally, after application of these materials, the solvents evaporate thereby leading to the formation of a micro-porous seal which is at least permeable for corrosive substances such as salts, water and moisture. Cured, rigid polymers are also not easily removed from the metal article while easy removal is important when repairs, replacements or inspections have to be carried out. A number of methods that can be used to protect a pipe against corrosion or other types of damage are known in the art.

EP 1644433, incorporated by reference, discloses an improved apolar, non-thermosetting, fluid polymer composition. However, although this improved composition may be used under humid conditions, no condensation of water may occur on the surface of the article to be protected while said composition is applied.

EP 751198, incorporated by reference, discloses an apolar, non-thermosetting, fluid polymer composition that can be used for protecting underground metal articles against corrosion wherein the metal articles are in contact with moisture. Polymers comprising polyisobutene and/or poly (oxydimethylsilylene) which have a viscosity of between 60000 and 1200000 cSt (60 to 1200 Pa·s) at 20° C. are advantageously used. The preparation may contain one or more fillers. The preparation may also contain one or more products which optionally have been obtained directly from petroleum, such as for example bituminous products and paraffin-like products, for example petroleum gel and wax. The apolar, non-thermosetting, fluid polymer composition may be used to protect risers of oil drilling platforms, steel components and pipelines that are submerged in seawater. However, during the application of the composition, it is necessary that the surface of the riser, steel component or pipeline is essentially dry in order to achieve sufficient adhesion of the composition to the surface.

EP 826817, incorporated by reference, discloses a band-like covering for the sealed covering of structures. The covering comprises a base and a kneadable material, such as a paste. The kneadable material may comprise a liquid polymer which is non-polar and does not cure, such as for example petroleum products such as tar-like, bituminous-like, vaseline-like and rubber-like materials. Preferably, polymers comprising polyisobutene and/or poly(oxydimethylsilylene) which have a viscosity between 60000 and 1200000 cSt (60 to 1200 Pa·s) at 20° C. are used. The product may comprise one or more fillers. The product may also comprise one or more products which are obtained directly or indirectly from petroleum, such as for example bituminous products, paraffin-like products, for example vaseline and wax. The covering may be used in the off-shore industry, but during application of the covering the surface of the structure should be essentially dry in order to achieve sufficient adhesion of the covering to the surface.

A composition known in the art for the corrosion protection of fully submerged articles is STOPAQ® Subsea Compound, marketed by Stopaq Oil & Gas Services B.V. STOPAQ® Subsea Compound, comprising a wax, petrolatum and bentonite, can be applied on the surface of an article while the article is submerged.

A disadvantage of the Subsea Compound is that the range of operation is insufficient for certain applications. The operating temperature of the Subsea Compound is in the range of about −20° C. to about 35° C., although under certain conditions a maximum operating temperature of about 45° C. may be achieved. At temperatures higher than about 45° C. the composition becomes more liquid and does not adhere to the surface of the article sufficiently and drips off the surface. In addition, at temperatures above about 45° C. a phase separation may occur, wherein the petrolatum starts to separate from the bulk of the product. Due to the relatively low maximum operating temperature, Subsea Compound is not suitable for the protection of articles that are not submerged, e.g. those parts of partly submerged articles that are situated above the water level, or sweating pipelines. As a consequence, two different corrosion protecting compositions need to be used for an article that is partly submerged: Subsea Compound for the protection of the submerged parts (i.e. the parts situated under the water level) and a different composition for the parts that are situated above the water level.

Several compositions comprising a polyisobutene, a filler and a plasticizer are known in the art as water stop compositions.

For example in U.S. Pat. No. 4,558,875, incorporated by reference, an aqueously-swelling water stop composition consisting of 10 to 40 wt. % of rubber with polyisobutylene as main ingredient, 10 to 20 wt. % of silicate, 10 to 60 wt. % of bentonite, said silicate and bentonite acting as fillers, and 10 to 40 wt. % of plasticizer is disclosed. The polyisobutylene preferably has a Staudinger molecular weight $M_s$ of 70,000 to 130,000, corresponding to a viscosity average molecular weight $M_v$ of about 840,000 to about 2,220,000 g mol$^{-1}$ (the viscosity average molecular weight $M_v$ can be calculated from the Staudinger molecular weight $M_s$ via the relation $M_v=0.0233(M_s)^{1.56}$, see for example the ExxonMobil product brochure "Vistanex PIB: Vistanex Polyisobutylene Properties & Applications", 2003, incorporated by reference). Preferred polyisobutenes are Vistanex® L-80, Vistanex® L-100 and Vistanex® L-140, having a viscosity average molecular weight of about 750,000 to about 2,350,000 g mol$^{-1}$. The plasticizer may be for example a mineral oil softener, a vegetable oil softener, a fat, an oil, a paraffinic derivative, etc. The water stop composition may be extruded into an elongated water stopper that can be inserted in for example a joint gap to stop water at the gap. U.S. Pat. No. 4,558,875 remains silent about corrosion prevention.

U.S. Pat. No. 5,663,230, incorporated by reference, discloses water stop compositions that exhibit a controlled swelling or volumetric expansion upon immersion in water. An exemplary water stop composition comprises about 10-30 wt. % elastomer blend, about 15-30 wt. % filler, about 20-40 wt. % plasticizer, and about 25-35 wt. % water swellable bentonite clay. The elastomer blend comprises 50-60 wt. % thermoplastic elastomers (TPE), 10-20 wt. % of a cross-linked butyl rubber and 20-40 wt. % of polyisobutene. Preferably, the elastomer blend, which is present in the water stop composition in about 10-30 wt. %, comprises about 30 wt. % polyisobutene. Polyisobutene homopolymers having a molecular weight of about 10,700-11,900 (Staudinger), corresponding to a viscosity average molecular weight $M_v$ of about 44,000 to about 53,000 g mol$^{-1}$, such as the Vistanex® LM polyisobutenes, are preferred. Examples of plasticizers include process oils such as for example petroleum aromatic naphthenic oils, naphthenic aromatic oils, naphthenic paraffinic oils and paraffinic oil. Water stop compositions comprising 6.10-6.24 wt. % polyisobutene are disclosed. U.S. Pat. No. 5,663,230 remains silent about corrosion prevention.

In the art there is a need for a material for the protection of articles against corrosion that can be applied in a wet environment, and that has a broad range of operating temperatures. There is also a need for a material that is easy to apply to the articles to be protected, and that can be applied while the article is in said wet environment. Preferably, the material can be applied in a wet environment without the need for extensive pre-treatment of the article to be protected.

SUMMARY OF THE INVENTION

The present invention relates to a process for the protection against corrosion of an article, comprising the steps of:
(a) application of a layer of a corrosion protecting composition comprising (i) an amorphous polymer composition comprising an amorphous polymer having a glass transition temperature of −20° C. or less and (ii) a water-absorbing filler, on a surface of the article, and
(b) application of a mechanical protective layer on top of said layer of said corrosion protecting composition, wherein the article is in a wet environment.

The invention also relates to said process for the protection against corrosion of an article according to the invention, wherein in step (a) a tape is applied on the surface of the article, wherein the tape comprises a layer of a corrosion protecting composition comprising (i) an amorphous polymer composition comprising an amorphous polymer having a glass transition temperature of −20° C. or less and (ii) a water-absorbing filler.

In addition, the present invention relates to a tape comprising a layer comprising a corrosion protecting composition comprising (i) an amorphous polymer composition comprising an amorphous polymer having a glass transition temperature of −20° C. or less and (ii) a water-absorbing filler.

Also, the invention relates to a composition comprising (i) an amorphous polymer composition comprising an amorphous polymer having a glass transition temperature of −20° C. or less, and (ii) a water-absorbing filler, wherein the composition comprises 20 to 80 wt. % of said amorphous polymer composition, based on the total weight of the composition, and wherein said amorphous polymer has a number average molecular weight $M_n$ in the range of 1,000 to 150,000 g mol$^{-1}$.

The invention further relates to an article, comprising:
(a) a layer of a corrosion protecting composition comprising (i) an amorphous polymer composition comprising an amorphous polymer having a glass transition temperature of −20° C. or less and (ii) a water-absorbing filler, on a surface of the article, and
(b) a mechanical protective layer to protect said layer of said corrosion protecting composition.

DETAILED DESCRIPTION OF THE INVENTION

The verb "to comprise" and its conjugations as used in this description and in the claims are used in their non-limiting sense to mean that items following the word are included, but items not specifically mentioned are not excluded.

In addition, reference to an element by the indefinite article "a" or "an" does not exclude the possibility that more than one of the element is present, unless the context clearly requires that there is one and only one of the elements. The indefinite article "a" or "an" thus usually means "at least one".

The term "polymer" is meant to include homopolymers and copolymers.

The term "copolymer" is meant to include polymers comprising two or more different monomers.

The term "poly-alkene" is herein used as a very general term and it refers to polymers comprising at least an alkene monomer.

Commonly, a skilled person uses the term "polyisobutene" in a general manner when referring to an amorphous polymer comprising isobutene monomers as a major component, and optionally further monomers, such as 1-butene, 2-butene and/or butadiene. These amorphous polymers have similar properties, in particular in terms of glass transition temperatures and surface tension. Depending on the desired purity of the polyisobutenes, they may be prepared by various methods (cf. Ullmanns "Encyklopädie der technischen Chemie", 4$^{th}$ Ed., Vol. 19, pages 216-223, 1980, and Vol. 13, pages 621-623, 1977, both incorporated by reference). According to the general common use, the term "polyisobutene" includes polymers that comprise isobutene monomers in amounts such as at least about 50 wt. %, at least about 75 wt. %, at least about 90 wt. % or at least about 95 wt. %, and a monomer selected from the group consisting of $C_2$-$C_{12}$ alkenes, $C_4$-$C_{12}$ alkadienes, and mixtures thereof in amounts such as about 50 wt. % or less, about 25 wt. % or less, about 10 wt. % or less or about 5 wt. % or less, calculated on the total weight of the polyisobutene. As such, according to the general common use, the term "polyisobutene" encompasses polymers such as polybutenes and essentially non-cross-linked butyl rubbers as described below. In the present application, the term "polyisobutene" is used for an isobutene polymer as defined above.

In the present application, the term "polyisobutene homopolymer" is used in order to distinguish polyisobutenes having a very high isobutene monomer content from, for example, polyisobutenes having a lower isobutene monomer content as described above, and from polybutenes and butyl rubbers as described below. Thus, the term "polyisobutene homopolymer" as used herein refers to a polymer consisting essentially of isobutene monomers, i.e. a polymer comprising more than about 98% to about 100% isobutene, preferably about 99% to about 100%, more preferably about 99.5% to about 100%, even more preferably about 99.7% to about 100%, and in particular about 99.9% to about 100%, all by weight of isobutene, based on the total weight of the polymer.

The term "polybutene" as used herein refers to a polymer prepared from a $C_4$-fraction obtained from the oil refining process (such as a $C_4$-fraction comprising 1-butene, 2-butene, isobutene and optionally butadiene).

The term "butyl rubber" as used herein refers to a polymer of about 95 wt. % to about 98 wt. % isobutene and about 2 wt. % to about 5 wt. % isoprene, based on the total weight of the polymer.

The Amorphous Polymer

According to the present invention, the amorphous polymer is preferably a hydrocarbonaceous polymer. The hydrocarbonaceous polymer is optionally (partly) halogenated, preferably by bromine, chlorine or fluorine. It is preferred that the hydrocarbonaceous polymer is essentially non-vulcanised (non-cross-linked) so that its cold flow properties are optimised. The amorphous polymer may be a blend of two or more different amorphous polymers.

It is preferred that the amorphous polymer has a number average molecular weight $M_n$ of about 500 to about 1,000,000, more preferably within the range of about 1000 to about 800,000, even more preferably within the range of about 1,000 to about 600,000, even more preferably within the range of about 1,500 to about 300,000 and in particular within the range of about 2,000 to about 150,000. The molecular weight distribution $M_w/M_n$ of the amorphous polymer is preferably between 1 to about 10, more preferably 1 to about 5, even more preferably 1 to about 4 and most preferably about 1.5 to about 3.5. Number average molecular weights and molecular weight distributions can for example be determined by gel permeation chromatography (GPC) as is well known in the art.

According to the present invention, the amorphous polymer has a glass transition temperature $T_g$ of less than about −20° C., preferably less than about −40° C., more preferably less than about −50° C. and most preferably less than about −60° C. Additionally, it is preferred that the amorphous polymer has a surface tension of less than about 50 mN/m at 20° C., preferably less than about 40 mN/m at 20° C. The glass transition temperature or glass transition temperatures can be determined by differential scanning calorimetry (DSC) as is well known in the art. The surface tension can also be determined by methods known in the art (cf. S. Wu, J. Colloid. Interface. Sci. 31, 153, 1969; D. G. LeGrand, G. L. Gaines, Jr., J. Colloid. Interface Sci. 31, 162, 1969; both incorporated by reference).

It is preferred that the amorphous polymer is a polyalkene. Preferred monomers for manufacturing the amorphous polymer are monomers selected from the group consisting of $C_2$-$C_{12}$ alkenes, $C_4$-$C_{12}$ alkadienes, and mixtures thereof, wherein the alkene and/or alkadiene may optionally be substituted with one or more bromine, chlorine or fluorine atoms. The alkene may be an α-alkene or an internal alkene. The diene may be conjugated or non-conjugated.

Preferably, the $C_2$-$C_{12}$ alkene is selected from the group consisting of ethene, propene, 1-butene, 2-butene, isobutene (2-methyl propene), 1-pentene, 1-hexene, 2-methyl-1-pentene, 4-methyl-1-pentene, 1-octene, and mixtures thereof.

Preferably, the $C_4$-$C_{12}$ alkadiene is selected from the group consisting of butadiene, isoprene (2-methyl-1,3-butadiene), 2,4-dimethyl butadiene, penta-1,3-diene, 3-methyl- 1,3-pentadiene, 2,4-hexadiene, 2-neopentyl-1,3-butadiene, 2-methyl-1,5-hexadiene, 2,5-dimethyl-2,4-hexadiene, 2-methyl-1,4-pentadiene, 2-methyl-1,6-heptadiene, cyclopentadiene, methyl cyclopentadiene, cyclohexadiene, 1-vinyl-cyclohexadiene, norbornadiene, 5-ethylidene-2-norbornene, divinylbenzene, dicylopentadiene, 1,4-hexadiene, 5-vinyl-2-norbornene, and mixtures thereof.

Amorphous polymers having a glass transition temperature of lower than about −20° C. are well known in the art and are for example disclosed in Kirk-Othmer, Encyclopedia of Chemical Technology, 4$^{th}$ Ed., Vol. 8, pages 905-1093, 1993, and 4th Ed, Vol. 9, pages 1-37, 1994, and in the Polymer Handbook, 3$^{rd}$ Ed., J. Bandrup, E. H. Immergut (Eds.), 1989, both incorporated by reference. The Polymer Handbook gives many examples for amorphous polymers having a glass transition temperature of lower than about −20° C.: butyl rubber (non-vulcanised) of about −71° C., poly(1-hexene) (prepared by Ziegler-Natta catalysis; cf. ref. 1072: J. Bourdariat, R. Isnard, J. Odin, J. Polym. Sci., Polym. Phys. Ed. 11, 1817-1828, 1973, incorporated by reference) of about −58° C. (page VI/213), isotactic poly(1-butene) (cf. for example R. W. Warfield, R. Brown, J. Polym. Sci. A-2 5, 791, 1967, incorporated by reference) of about −24° C. (page VI/213), and poly(isobutene) of about −73° C. (page VI/214). It should be noted that some of these polymers can sometimes be (partly) crystalline which is often dependent from catalyst compositions and process conditions employed in the polymerisation process. For example, EP 300.638 A2, incorporated by reference, discloses a process for the preparation of highly crystalline poly(1-butene). However, it can be envisaged that e.g. a certain polyisobutene, a certain polybutene or a certain butyl rubber, may have a glass transition temperature that differs from the value listed in the Polymer Handbook. Atactic polypropene has a glass transition temperature of about −20° C. (cf. U. Gaur, B. Wunderlich, J. Phys. Chem. Ref. Data 10, 1052-1063, 1981, incorporated by reference).

Amorphous polymers having a surface tension of less than about 50 mN/m at 20° C. are also well known in the art. The Polymer Handbook, 3$^{rd}$ Ed., J. Bandrup, E. H. Immergut (Eds.), 1989, incorporated by reference, gives various examples for such amorphous polymers: polyisobutene ($M_n$=2300): 33.6 mN/m at 20° C.; atactic polypropene: 29.4 mN/m at 20° C.; branched polyethene ($M_n$=7000): 35.3 mN/m at 20° C.; ethene propene copolymers ($M_w$ ranging from about 15,000 to about 63,000; propene content ranging from about 34 mol % to about 60 mol %): 30.7-33.8 mN/m at 20° C.; poly(4-methyl-1-pentene): 25 mN/m at 20° C. It should be noted that surface tension is essentially independent from molecular weight when the molecular weight is greater than about 2000 and that the surface tension then reaches within about 1 mN/m of the value at indefinite molecular weight.

According to a preferred embodiment of the present invention, the amorphous polymer is preferably selected from the group consisting of:
(a) a polymer comprising about 50.0% to about 98% by weight of isobutene and about 2% to about 50.0% of a $C_2$-$C_{12}$ alkene other than isobutene, a $C_4$-$C_{12}$ alkadiene, or a mixture thereof, based on the total weight of the polymer;
(b) a polymer comprising more than about 98% to about 100% by weight of isobutene, based on the total weight of the polymer;
(c) a polymer comprising about 50.0% to about 99.9% by weight of propene and about 0.1% to about 50.0% of a $C_2$-$C_{12}$ alkene other than propene, a $C_4$-$C_{12}$ alkadiene, or a mixture thereof, or about 100 wt. % propene, based on the total weight of the polymer;
(d) a polymer comprising about 0.1% to about 50.0% by weight of ethene and about 50.0% to about 99.9% of a $C_2$-$C_{12}$ alkene other than ethene, a $C_4$-$C_{12}$ alkadiene, or a mixture thereof, based on the total weight of the polymer;
(e) a polymer comprising about 0.1% to about 50.0% by weight of 2-methyl-1-pentene and about 50.0% to about 99.9% of a $C_2$-$C_{12}$ alkene other than 2-methyl-1-pentene, a $C_4$-$C_{12}$ alkadiene, or a mixture thereof, or about 100 wt. % 2-methyl-1-pentene, based on the total weight of the polymer; and
(f) mixtures of (a), (b), (c), (d) and/or (e).

Examples for group (a) include "polyisobutenes", "polybutenes" and "butyl rubbers". Examples for group (b) include "polyisobutene homopolymers". Examples for group (c) include ethene-propene elastomers, EPDM elastomers and atactic polypropenes. Examples for group (d) include ethene butene copolymers. Examples for group (e) include homopolymers of 2-methyl-1-pentene.

According to a more preferred embodiment of the present invention, the amorphous polymer is selected from the group consisting of polyisobutenes, polybutenes, butyl rubbers, atactic polypropene, copolymers of propene and a $C_2$-$C_{12}$ alkene other than propene (and optionally a diene), copolymers of ethene and a $C_2$-$C_{12}$ alkene other than ethene (and optionally a diene), and mixtures thereof. According to an even more preferred embodiment of the present invention, the amorphous polymer is selected from the group consisting of ethene-propene copolymers, ethene-butene copolymers, ethene-propene-butene terpolymers, ethene-propene-diene copolymers, polyisobutenes, polybutenes, butyl rubbers, atactic polypropenes and mixtures thereof. Even more preferably, the amorphous polymer is selected from the group consisting of polyisobutenes, polybutenes, butyl rubbers, atactic polypropenes and mixtures thereof. Yet even more preferably, the amorphous polymer is selected from the group consisting of (a), (b) and a mixture thereof, wherein (a) and (b) are polymers as defined above. Yet even more preferably, the amorphous polymer is selected from the group consisting of polyisobutenes, polybutenes, butyl rubbers and mixtures thereof. Yet even more preferably, the amorphous polymer is a polyisobutene, and preferably the polyisobutene is a polyisobutene homopolymer. All these polymers have a glass transition temperature of less than about −20° C. as is disclosed above.

The polybutene has preferably also a number average molecular weight $M_n$ of about 500 to about 20,000, more preferably of about 1,300 to about 20,000, a molecular weight distribution of about 1.5 to about 3, a density of about 0.90 to about 0.98 g/cm$^3$ and a kinematic viscosity of about 200 cSt (mm$^2$·s$^{-1}$) to about 100,000 cSt (mm$^2$·s$^{-1}$) at 100° C. according to ASTM D 445 (data in Saybolt Universal Seconds which are used in e.g. the Ineos datasheet September 2008 can be converted into mm$^2$·s$^{-1}$ according to ASTM D 2161). Suitable polybutenes include for example several Indopol grades available from Ineos (Great Britain), several polybutene grades available from Kermat (Belgium), several Nisseki polybutene grades available from JX Nippon Oil & Energy, and several KVIS grades available from Kothari Petrochemicals (India). For example, Indopol H-300 has a glass transition temperature of about −66.9° C. (DSC), a number average molecular weight $M_n$ of about 1300 (GPC), a molecular weight distribution of about 1.65 (GPC), a density of about 0.904 g/cm$^3$ and a kinematic viscosity of about 605 to about 655 cSt at 100° C. (Ineos datasheet September 2008). Indopol H-18000 has a number average molecular weight $M_n$ of about 6000 (GPC), a molecular weight distribution of about 1.70 (GPC), a density of about 0.921 g/cm³ and a kinematic viscosity of about 36000 to about 45000 cSt at 100° C. (Ineos datasheet September 2008). KVIS 30 has a molecular weight of about 1250 to about 1350, a kinematic viscosity of about 600 to 697 cSt at 100° C. and a density of about 0.8910 to about 0.910 g/cm³.

The butyl rubber has preferably a Mooney viscosity ML 1+8 (ASTM D 1646; 125° C.) of about 25 to about 75 and a level of unsaturation of about 1.0 to about 3.0 mol %. Suitable materials include Exxon™ Butyl Rubber which has a density of 0.92 g/cm³ and Lanxess Butyl 101-3 which has a density of 0.92 g/cm³, a Mooney viscosity ML 1+8 (ASTM D 1646; 125° C.) of 51±5 and an unsaturation of 1.75±0.20 mol %.

The poly(2-methyl-1-pentene) has preferably a melt index of about 1 to about 250 g/min (ASTM D 1236, 260° C., 5 kg), a softening point of about 160° to about 200° C. (Vicat, ASTM D 1525) and a density of about 0.82 to about 0.95 g/cm³ at 25° C. Amorphous poly(2-methyl-1-pentene) having a low glass transition temperature is for example disclosed by Haiyang Gao, Xiaofang Liu, Ying Tang, Jin Pan and Qing Wu, Polym. Chem. 2(6), 1398-1403, 2011, incorporated by reference.

The ethene-propene copolymers, ethene-butene copolymers and ethene-propene-butene terpolymers have preferably a Brookfield viscosity (sometimes also referred to as melt viscosity) of about 300 to about 200,000 mPa·s at 190° C. according to ASTM D 3236. Suitable products include certain Eastoflex grades which are available from Eastman Chemical Company, Rextac® grades of Rextac LLC and Vestoplast® grades of Evonik. The ethene-propene copolymer Eastoflex 1045 has for example a Brookfield viscosity of about 4500 mPa·s (ASTM D 3236) and a glass transition temperature of −22° C. whereas Eastoflex E1003 has a Brookfield viscosity of about 300 mPa·s (ASTM D 3236) a glass transition temperature of −33° C. (cf. Eastman brochure "Eastoflex™-amorphous polyolefins", 2009). Other examples include Vestoplast® 703 which has a glass transition temperature of about −28° C. and a Brookfield viscosity of about 2700 mPa·s at 190° C. and Vestoplast® 792 which has a glass transition temperature of about −27° C. and a Brookfield viscosity of about 120000 mPa·s at 190° C. (Evonik brochure "Vestoplast®-Amorphous Poly-alfa-olefins"). In such amorphous propene copolymers and terpolymers, the amount of propene is preferably at least about 50 percent by weight, and is preferably between about 70 to about 98 percent by weight, based on the total weight of the atactic propene copolymer.

The atactic polypropene has a Brookfield viscosity of about 200 to about 10000 mPa·s at 190° C. according to ASTM D 3236. Suitable products include Polytac™ grades of Crowley Chemical Company and Rextac® grades of Rextac LLC. For example, Polytac™ grades have a Brookfield viscosity in the range of about 500 to about 2500 mPa·s at 190° C. and Rextac® 2104, 2115 and 2180 have a Brookfield viscosity of 400, 1500, and 8000 mPa·s, respectively, at 190° C.

The polyisobutene has preferably a number average molecular weight $M_n$ of about 500 to about 1,000,000, more preferably within the range of about 1000 to about 800,000. In a preferred embodiment, the polyisobutene has a number average molecular weight $M_n$ in the range of about 1000 to about 600,000, more preferably within the range of about 1000 to about 300,000, even more preferably in the range of about 1500 to about 180,000 and in particular within the range of about 2000 to about 150,000. The molecular weight distribution $M_w/M_n$ of the polyisobutenes is preferably between 1 to about 10, more preferably 1 to about 5, even more preferably 1 to about 4 and most preferably about 1.5 to about 3.5.

The number average molecular weight $M_n$ of the polyisobutenes is determined by GPC for the lower molecular weights, e.g. up to about 100,000. For the higher number average molecular weights, they are determined by viscosity measurements (Staudinger Index $J_o$, formerly known as intrinsic viscosity), wherein the Staudinger Index is calculated from the flow time at 20° C. through capillary 1 of an Ubbelohde viscometer (for measuring the flow time, a diluted polymer solution is used) using the following formulas:

$$J_o = \eta_{sp}/c(1+0.31\times\eta_{sp})[cm^3/g]$$

$$\eta_{sp} = (t/t_o)-1$$

wherein t is the flow time of the solution, with Hagenbach-Couette correction, $t_o$ is the flow time of the solvent (e.g. isooctane), with Hagenbach-Couette correction, and c is the concentration if the solution in g/cm³. The number average molecular weight $M_n$ and the viscosity average molecular weight $M_v$ are then calculated as follows:

$$M_n = 0.94\sqrt{\frac{J_o \times 1000}{2.27}}$$

$$M_v = 0.65\sqrt{\frac{J_o \times 100}{3.06}}$$

Reference is made to the BASF brochure "Glissopal® 1000, 1300 and 2300" of December 2005, to the BASF brochure "Oppanol® B types" (B10 to B15) of January 2009 and to the BASF brochure "Oppanol® B types" (B30 to B80) of January 2009, all incorporated by reference.

The polyisobutenes to be used in the composition according to the present invention preferably have a Staudinger Index $J_o$ of about 1 to about 1500 cm³/g, preferably of about 2 to about 1000 cm³/g, as determined at 20° C. In a preferred embodiment the polyisobutenes have a Staudinger index $J_o$ of about 1 to about 500 cm³/g, preferably of about 2 to about 300 cm³/g and more preferably of about 3 to about 150 cm³/g.

The polyisobutenes have further preferably a surface tension of less than about 40 mN/m at 20° C. The density of the polyisobutenes is preferably between about 0.86 to about 0.98 g/cm³.

The polyisobutenes may be prepared in various ways. Polymerisation may be conducted in single stage processes or in multi stage processes. It is preferred that the polymerisation is conducted in the liquid phase using a Lewis acid as catalyst, preferably boron trifluoride complex catalyst, optionally in the presence of a cocatalyst. Such processes are well known in the art.

Preferred polyisobutenes are from the Glissopal and Oppanol grades, in particular Oppanol grades, which are commercially available from BASF, in particular from the Oppanol B type. Other preferred polyisobutenes are available from Nippon Oil, in particular the Tetrax grades. These polyisobutenes are in this document classified as "polyisobutene homopolymers", i.e. polymers comprising more than about 98 wt. % of isobutene, based on the total weight of the polymer.

The Amorphous Polymer Composition

The amorphous polymer composition according to the present invention preferably comprises an amorphous polymer or a mixture of two or more amorphous polymers. Such amorphous polymers are disclosed above.

According to the present invention, it is preferred that the amorphous polymer composition comprises about 50% to about 100% by weight of a polyisobutene, more preferably a polyisobutene homopolymer, and about 0% to about 50% by weight of another amorphous polymer, based on the total weight of the amorphous polymer composition, wherein it is preferred that the other amorphous polymer is selected from the group consisting of the amorphous polymers (a)-(f) as disclosed above.

More preferably, the other amorphous polymer is selected from the group consisting of polybutenes, polyisobutenes, butyl rubbers, ethene-propene copolymers, ethene-butene copolymers, ethane-propene-butene terpolymers, amorphous propene copolymers, atactic polypropenes, poly(2-methyl-1-pentene) and mixtures thereof. These polymers have a glass transition temperature of less then about −20° C. as is disclosed above.

More preferably, the amorphous polymer composition comprises about 70% to about 100% by weight of a polyisobutene, preferably a polyisobutene homopolymer, and about 0% to about 30% by weight of the other amorphous polymer, based on the total weight of the amorphous polymer composition. Even more preferably, the amorphous polymer composition comprises about 90% to about 100% by weight of a polyisobutene, preferably a polyisobutene homopolymer, and about 0% to about 10% of the other amorphous polymer, based on the total weight of the amorphous polymer composition. Most preferably, the amorphous polymer composition comprises about 100% by weight of a polyisobutene, preferably a polyisobutene homopolymer.

Accordingly, the present invention relates to amorphous polymer compositions comprising about 75% to about 95% by weight of a polyisobutene, preferably a polyisobutene homopolymer, and about 5% to about 25% by weight of the other amorphous polymer, based on the total weight of the amorphous polymer composition. The present invention also relates to amorphous polymer compositions comprising about 80% to about 90% by weight of a polyisobutene and/or a polyisobutene homopolymer and about 10% to about 20% by weight of the other amorphous polymer, based on the total weight of the amorphous polymer composition.

The Corrosion Protecting Composition

The corrosion protecting composition according to the invention comprises (i) an amorphous polymer composition comprising an amorphous polymer having a glass transition temperature of −20° C. or less and (ii) a water-absorbing filler. Said amorphous polymer composition (i) and said amorphous polymer are described in detail above. The water-absorbing filler (ii) is described in more detail below.

Preferably, the corrosion protecting composition comprises about 20 to about 80 wt. % of the amorphous polymer composition (i), more preferably about 20 to about 70 wt. %, even more preferably about 25 to about 60 wt. % and most preferably about 30 to about 50 wt. %, based on the total weight of the composition. Preferred embodiments of the amorphous polymer and of the amorphous polymer composition are disclosed above.

In a further preferred embodiment, the amorphous polymer has a number average molecular weight $M_n$ of about 500 to about 1,000,000, more preferably within the range of about 1,000 to about 800,000, even more preferably within the range of about 1,000 to about 600,000, even more preferably within the range of about 1,500 to about 300,000 and in particular within the range of about 2,000 to about 150,000.

Therefore, in a preferred embodiment, the invention relates to a composition for protection against corrosion, comprising:
  (i) an amorphous polymer composition comprising an amorphous polymer having a glass transition temperature of −20° C. or less, and
  (ii) a water-absorbing filler,
wherein the composition comprises 20 to 80 wt. % of the amorphous polymer composition, based on the total weight of the composition, and wherein the amorphous polymer has a number average molecular weight $M_n$ in the range of 1,000 to 150,000 g mol$^{-1}$.

The corrosion protecting composition preferably comprises about 20 to about 80 wt. % of the water-absorbing filler (ii), based on the total weight of the composition.

In a preferred embodiment, said amorphous polymer is selected from the group of polymers consisting of (a)-(f) as defined above. In a further preferred embodiment, the amorphous polymer is selected from the group consisting of (a), (b) and a mixture thereof.

In a preferred embodiment, the corrosion protecting composition further comprises a plasticizer (iii) selected from the group consisting of wax, petrolatum and a mixture thereof. The plasticizer (iii) is described in more detail below.

The corrosion protecting composition may further comprise one or more other additives, e.g. additional filler materials and/or anti-oxidants as described below, surface tension modifiers, pH regulating agents such as for example potassium or sodium hydroxide (KOH or NaOH), colorants, pigments and the like. In a preferred embodiment the corrosion protecting composition further comprises a surface tension modifier (iv). Examples of surface tension modifiers include anionic detergents such as fatty acids (e.g. tall oil acid), cationic detergents, zwitterionic detergents and non-ionic detergents. Preferably, the surface tension modifier is present in an amount of about 0.1 to about 20 wt. %, more preferably in an amount of about 0.1 to about 15 wt. %, even more preferably in an amount of about 0.3 to about 10 wt. % and most preferably in an amount of about 0.5 to about 5 wt. %, all based on the total weight of the composition.

In another preferred embodiment the corrosion protecting composition according to the invention also comprises an antioxidant (v). The anti-oxidant (v) is described in more detail below.

In a preferred embodiment the corrosion protecting composition according to the invention comprises about 20 to about 79 wt. % of the amorphous polymer composition (i), about 20 to about 60 wt. % of a water-absorbing filler (ii) and about 1 to 20 wt. % of a plasticizer (iii) selected from the group consisting of wax, petrolatum and a mixture thereof, based on the total weight of the composition. In a further preferred embodiment the corrosion protecting composition according to the invention comprises about 25 to about 75 wt. % of the amorphous polymer composition (i), about 22 to about 60 wt. % of a water-absorbing filler (ii) and about 3 to 15 wt. % of a plasticizer (iii) selected from the group consisting of wax, petrolatum and a mixture thereof, based on the total weight of the composition.

In a preferred embodiment, the corrosion protecting composition according to the invention comprises about 20 to about 78.9 wt. % of the amorphous polymer composition (i), about 20 to about 45 wt. % of a water-absorbing filler (ii), about 1 to 20 wt. % of a plasticizer (iii) selected from the group consisting of wax, petrolatum and a mixture thereof, and about 0.1 to about 15 wt. % of one or more a surface tension modifier (iv), based on the total weight of the composition. In another preferred embodiment, the corrosion protecting composition according to the invention comprises about 20 to about 78.9 wt. % of the amorphous polymer composition (i), about 20 to about 50 wt. % of a water-absorbing filler (ii), about 1 to 15 wt. % of a plasticizer (iii) selected from the group consisting of wax, petrolatum and a mixture thereof, and about 0.1 to about 15 wt. % of one or more a surface tension modifier (iv), based on the total weight of the composition. In another preferred embodiment, the corrosion protecting composition according to the invention comprises about 20 to about 72.9 wt. % of the amorphous polymer composition (i), about 24 to about 50 wt. % of a water-absorbing filler (ii), about 3 to 15 wt. % of a plasticizer (iii) selected from the group consisting of wax, petrolatum and a mixture thereof, and about 0.1 to about 15 wt. % of one or more a surface tension modifier (iv), based on the total weight of the composition.

Preferably, the corrosion protecting composition according to the invention comprises (i) about 20 to about 50 wt. % of the amorphous polymer composition comprising an amorphous polymer having a glass transition temperature of −20° C. or less, (ii) about 20 to about 40 wt. % of a water-absorbing filler, (iii) about 1 to about 20 wt. % of a plasticizer, (iv) about 0.1 to about 15 wt. % of a surface tension modifier, and (v) about 0.05 to about 5 wt. % of an anti-oxidant, all based on the total weight of the composition. Preferably, the total of components (i), (ii), (iii), (iv) and (v) is equal to 100 wt. %. However, if said total is not equal to 100 wt. %, it will be clear to a person skilled in the art that the composition comprises additional components, e.g. additional filler materials, additives, etc.

Therefore, the composition optionally further comprises one or more additives (vi), and/or one or more additional fillers (vii). If one or more additives (vi) are present, it is preferred that each of the one or more additives is present in an amount of about 0.01 to about 10 wt. %, preferably in an amount of about 0.05 to about 5 wt. %, based on the total weight of the composition. If one or more additional fillers (vii) are present, it is preferred that the total amount of the one or more additional fillers is about 25 to about 45 wt. %, based on the total weight of the composition. Preferably, the total of components (i), (ii), (iii), (iv), (v) and (vi) and/or (vii) equals 100 wt. %. However, if said total does not equal 100 wt. %, it will be clear to a person skilled in the art that the composition comprises additional components.

If one or more additives (vi) are present, it is preferred that the one or more additives are selected from the group consisting of colorants and pH regulating agents, The additional filler (vii) is described in more detail below.

In yet another preferred embodiment, the corrosion protecting composition comprises about 20 to about 80 wt. % of the amorphous polymer composition (i), about 20 to about 80 wt. % of a water-absorbing filler (ii) and about 0 wt. % of an additional filler (vii), all based on the total weight of the corrosion protecting composition. More preferably, the composition comprises about 20 to about 70 wt. % of the amorphous polymer composition (i), about 22 to 60 wt. % of a water-absorbing filler (ii) and about 8 to about 58 wt. % of an additional filler (vii), all based on the total weight of the corrosion protecting composition. Even more preferably the composition comprises about 25 to about 60 wt. % of the amorphous polymer composition (i), about 24 to 50 wt. % of a water-absorbing filler (ii) and about 16 to about 51 wt. % of an additional filler (vii), all based on the total weight of the corrosion protecting composition. Most preferably the composition comprises about 30 to about 50 wt. % of the amorphous polymer composition (i), about 25 to 40 wt. % of a water-absorbing filler (ii) and about 25 to about 45 wt. % of an additional filler (vii), all based on the total weight of the corrosion protecting composition.

An important property of the corrosion protecting composition according to the invention is its capacity to absorb water. The corrosion protecting composition is capable of absorbing in a short time (i.e. within a several seconds/minutes to several hours) sufficient water from the surface of the article in a wet environment to be protected in order to enable the corrosion protecting composition to adhere quickly to the surface of said article.

The water-absorption of the corrosion protecting composition according to the invention is determined by an immersion method based on ASTM Standard D 570-98 (2005), "Standard Test Method for Water Absorption of Plastics", incorporated by reference, as is described below in the examples. The water-absorption thus determined is the amount of water that is absorbed in relation to the mass of the corrosion protecting composition in a certain amount of time, and is expressed in wt. %.

Preferably, the corrosion protecting composition according to the invention has a water-absorption in the range of about 1 to about 30 wt. %, more preferably in the range of about 1.5 to about 25 wt. %, even more preferably in the range of about 2 to about 20 wt. %, even more preferably in the range of about 2.5 to about 15 wt. %, and most preferably in the range of about 3 to about 10 wt. %.

However, once the thickness of a layer of the corrosion protecting composition according to the invention surpasses a certain minimum thickness, the water-absorption of said layer of corrosion protecting composition no longer depends on the mass of the corrosion protecting composition, but rather on the surface area of said layer. Therefore, the water-absorption is preferably expressed in terms of the amount of water that is absorbed in relation to the surface area of a layer of the corrosion protecting composition in a certain amount of time, i.e. water-absorption ($g/m^2$). The water-absorption ($g/m^2$) of the corrosion protecting composition according to the invention is also determined by an immersion method based on ASTM Standard D 570-98 (2005), and is described below and in the examples.

When determining the water-absorption expressed in grams of water absorbed per square meter of a layer of the corrosion protecting composition, denoted as the water-absorption ($g/m^2$), care should be taken to ensure that when determining the water-absorption ($g/m^2$) as described below the layer of the corrosion protecting composition has a thickness that is larger than said minimum thickness, thus eliminating the influence of layer thickness on the water-absorption ($g/m^2$).

When the water-absorption ($g/m^2$) of the corrosion protecting composition is too low, the composition is not capable of absorbing sufficient water from the surface of the article to be protected in a short time to enable the corrosion protecting composition to adhere sufficiently quick to the surface of said article. Therefore, the water-absorption ($g/m^2$) of the corrosion protecting composition according to the invention is preferably about 100 $g/m^2$ or higher, more preferably about 300 $g/m^2$ or higher, even higher, even more preferably about 750 $g/m^2$ or higher, and most preferably about 900 $g/m^2$ or higher.

However, when the water-absorption (g/m²) of the corrosion protecting composition is too high, the composition becomes weaker, starts losing its consistency and may detach too easily from a surface. Therefore, preferably the water-absorption (g/m²) of the corrosion protecting composition according to the invention is about 10,000 g/m² or lower, preferably about 9,000 g/m² or lower, more preferably about 7,500 g/m² or lower, even more preferably about 6,000 g/m² or lower, even more preferably about 4,500 g/m² or lower, and most preferably about 3,000 g/m² or lower.

Preferably, the corrosion protecting composition according to the invention has a water-absorption in the range of about 100 to about 10,000 g/m², preferably of about 300 to about 9,000 g/m², more preferably in the range of about 450 to about 7,500 g/m², even more preferably in the range of about 600 to about 6,000 g/m², even more preferably in the range of about 750 to about 4,500 g/m², and most preferably in the range of about 900 to about 3,000 g/m².

As described above, and in more detail in the examples, the water-absorption (in wt. %) and the water-absorption (g/m²) are determined by an immersion method based on ASTM Standard D 570-98 (2005), using distilled water at a temperature of 23±1° C., and with 72 hours of immersion. As described in the examples, the determination of the water-absorption (g/m²), $w_A$ (g/m²), of the corrosion protecting composition according to the invention comprises the steps of:
(1) weighing a cup having a known depth in the range of 15 to 25 mm and a surface with a known diameter (round surface) or a known length and width (rectangular or square surface) in the range of 30 to 50 mm, to obtain mass A;
(2) completely filling the plastic cup with said composition, avoiding air entrapments, and smoothing the surface;
(3) weighing the filled cup to obtain mass B;
(4) placing the filled cup in a container of distilled water maintained at a temperature of 23±1° C., completely submerging the cup;
(5) placing the cup in a climate cabinet and maintaining the water temperature at 23±1° C. for 72 hours;
(6) taking the cup out of the container after 72 hours, drying its surfaces and weighing the dried cup to obtain mass C; and
(7) calculating the water-absorption (g/m²), expressed in g/m², as follows:

$$w_A\left(\frac{g}{m^2}\right) = \frac{[(C-A)-(B-A)]}{\text{surface of cup}} * 100\%.$$

One of the advantages of the corrosion protecting composition according to the present invention is that the composition has an improved setting on the article to be protected, including an improved deformability. In addition, the composition according to the invention has a very good adhesion, i.e. a very good adhesive power to the surface of the article, even when said surface is wet. Furthermore, the composition according to the invention has a very high adhesive tack. In comparison with for example the STOPAQ® Subsea Compound known from prior art, not only the adhesive power of the composition according to the invention to the surface to be protected is improved, but also, due to the improved adhesive tack of said composition, optimum adhesion of the composition to said surface is achieved in less time, in particular at lower temperatures.

The composition according to the invention does not set and therefore remains soft, is essentially impermeable for water, moisture, salts and the like and is pore-tight. An additional and very important feature of the corrosion protecting composition of the present invention is that if a protective layer of the composition is mechanically deformed to a relatively small extent, e.g. by wave action, the damage is repaired automatically within a relatively short period of time due to the fluid-like and/or visco-elastic nature of the composition of the invention. That is, the composition has self-recovering properties and any deformation or damage is repaired as a result of flow of the composition into holes or cavities caused by mechanical deformations or other stresses. Consequently, a protective layer comprising the composition according to the invention is not only smooth when applied, but even if indentations, imprints, dents, cavities and the like are caused by mechanical forces, they will disappear in due course and the smooth surface of the protective layer reappears. Because of this fluid-like nature any protective layer comprising the composition according to the present invention does not tear or break and does not build up internal stresses. Likewise, irregularities on the surface of the article are perfectly filled or enveloped by the corrosion protecting composition according to the invention, whereas materials according to the state of the art often give rise to problems in such circumstances. The fluid-like and/or visco-elastic nature of the composition according to the invention also implies that it has no pot-life whereas protective coatings and curable resins known in the art need to be applied within a certain period of time.

When for example the composition according to the invention is compared to the STOPAQ® Subsea Compound known from the prior art, an improved protection against corrosion is obtained due to the fact that the composition according to the invention not only prevents water from reaching the surface to be protected, but also minimizes the voids present in between said surface and the layer of the corrosion protecting composition.

Other advantages of the corrosion protecting composition according to the invention are a high chemical stability and resistance over a wide pH-range and essentially no cathodic disbondment or undercreep corrosion (e.g. caused by under-film migration of water).

Additionally, the composition according to the invention has a very good thermal stability and can be used within an operating temperature range of about −20° C. to about 60° C., preferably of about −25° C. to about −65° C., more preferably of about −30° C. to about 70° C., and most preferably of about −50° C. to about 80° C. When an article is partly submerged, for example the riser of an oil platform, in general the temperature above the water surface differs from the temperature below the water surface. Due to the wide operating temperature range of the corrosion protecting composition according to the invention, it is now possible to use the same corrosion protecting composition both on parts of the article that are situated below the water surface and on parts above the water surface.

There are additional important advantages of the corrosion protecting composition according to the invention. Most protecting systems require the use of a primer before these systems are applied to the article to provide sufficient adhesion, in particular in a wet environment. The use of a primer is unnecessary with the composition according to the present invention which implies that the composition can be applied within a shorter period of time thereby making the operation less expensive.

Problems that do arise when e.g. prior art coating systems are applied are that air bubbles may be formed in the coating which easily burst open thereby leading to pinholes in the coating layer and a poor protection. The present inventors have found that when the composition of the present invention is used, any air bubble present between the surface of the article and the protective layer of the composition according to the invention migrates within the protective layer of the composition, away from the surface of the article. In locations where the article is in contact with salt, e.g. sea water, salt crystals are formed on the surface of the metal article and before e.g. a coating system is applied to said surface, it requires thorough cleaning. In contrast, the composition according to the invention encapsulates the salt crystals and removal of these crystals is not required. The necessity that for prior art protecting systems the salt crystals must be removed is that these crystals are hygroscopic and absorb water that permeates the protective layer. As a consequence, the salt crystals swell thereby causing cracks in the protective layer which eventually leads to a deteriorated protection to corrosion. In practice these salt crystals cause serious problems in the operation of the article, requiring that the state of the art protective systems must be replaced regularly. The composition according to the invention, however, does not suffer from such problems and is therefore much more economical to the end-user.

Articles protected by the composition according to the invention can be easily inspected since a protective layer of the composition according to the invention can easily be removed and, after inspection, be reapplied. Most materials according to the state of the art are far more difficult to remove. Moreover, when removed the surface of the metal article needs to be thoroughly cleaned before such prior art materials are reapplied, if possible at all, since it will be apparent to those skilled in the art that cured systems, which are applied in the uncured state, cannot be reapplied. As a consequence, a protective layer of the composition according to the invention is also more easily tested.

Filler

The corrosion protecting composition according to the invention comprises a water-absorbing filler (ii). A water-absorbing filler is defined as a material that is able to absorb water and that is suitable for use as a filler material.

The water-absorbing filler may comprise two or more water-absorbing fillers and may be of organic and/or inorganic nature. The water-absorbing filler may comprise a swellable filler, i.e. a filler that expands when it is wet. The water-absorption of a filler is herein defined as the amount of water that is absorbed in relation to the dry mass of a filler in a certain amount of time. The water-absorption ($w_A$) is expressed as the ratio of the mass of water absorbed by the dry filler specimen in a certain time ($m_{wg}$), to the dry mass of the filler specimen ($m_d$). The water-absorption is expressed as the proportion by mass, in wt. %.

$$w_A = \frac{m_{wg}}{m_d} \times 100\%$$

The water-absorption of a filler is determined according to the procedure described in standard NEN-EN-ISO 10769: 2011, incorporated by reference. Said standard relates to a procedure for the determination of the water absorption of bentonite. However, the same procedure is herein applied for the determination of the water-absorption of different fillers. As according to NEN-EN-ISO 10769:2011, water-absorption of a water-absorbing filler is measured at ambient temperature, and the duration of the test is 24 h.

In a preferred embodiment, the water-absorbing filler has a water-absorption of about 1 wt. % or higher, preferably of about 2 wt. % or higher, more preferably of about 3 wt. % or higher, even more preferably of about 5 wt. % or higher, yet even more preferably of about 10 wt. % or higher, yet even more preferably of about 15 wt. % or higher, yet even more preferably of about 20 wt. % or higher, yet even more preferably of about 25 wt. % or higher and yet even more preferably of about 30 wt. % or higher. In a further preferred embodiment, the water-absorbing filler has a water-absorption of about 20 wt. % or higher, more preferably of about 25 wt. % or higher and even more preferably of about 30 wt. % or higher. Even more preferably, the water-absorption of the water-absorbing filler is about 40 wt. % or higher, about 50 wt. % or higher or about 70 wt. % or higher. Yet even more preferably, the water-absorption of the water-absorbing filler is about 100 wt. % or higher. Most preferably, the water-absorption of the water absorbing filler is about 150 wt. % or higher, or even of about 200 wt. % or higher. The amount of water-absorbing filler that is present in the composition depends, amongst others, on the water-absorption $w_A$ of said filler. When a water-absorbing filler with a lower water-absorption is applied in the corrosion protecting composition, the amount of said filler in the composition is generally higher than when a filler with a high water-absorption is applied, in order to ensure a sufficient water-absorption of the corrosion protecting composition.

The water-absorption of a filler depends amongst others on the specific surface, the particle size and the surface activity of the filler.

Calcium carbonate ($CaCO_3$) for example is not a water-absorbing filler according to the definition of a water-absorbing filler as described herein.

A wide variety of water-absorbing fillers is known in the art, and examples include silica, calcium oxide, several clay minerals, e.g. vermiculites and smectites, and water-absorbing polymers, e.g. polyacrylamides such as polymethylacrylate. Water absorbing polymers are known in the art and are described in more detail in for example "Modern Superabsorbent Polymer Technology", F. L. Buchholtz and A. T. Graham, Wiley VCH, 1998, pp. 71-103, incorporated by reference herein.

In a preferred embodiment the water-absorbing filler comprises a mineral clay. A clay mineral is a hydrous phyllosilicate, i.e. a hydrous silicate of aluminium (Al), magnesium (Mg), potassium (K) or iron (Fe), and other less abundant elements. Clay minerals are known in the art, and are described in more detail in for example Kirk-Othmer, "Encyclopedia of Chemical Technology", $4^{th}$ Ed., John Wiley & Sons, New York 1993, Volume 6, pp. 383-423, incorporated by reference. Examples of clay minerals include vermiculites, kaolinites and smectites such as montmorillonites and bentonites. In a further preferred embodiment the water-absorbing filler comprises a montmorillonite clay and/or a bentonite clay, in particular a bentonite clay. The clay mineral may for example comprise a sodium bentonite clay, a sodium montmorillonite clay, a potassium bentonite clay, a potassium montmorillonite clay a calcium bentonite clay, a calcium montmorillonite clay, an aluminium bentonite clay, an aluminium montmorillonite clay, a combination of two or more bentonite clays, a combination of two or more montmorillonite clays, or a combination of one or more bentonite clay and one or more montmorillonite clay. Furthermore, the bentonite clay and/or the montmorillonite clay may comprise a surface modified bentonite clay. Preferably, the mineral clay comprises a bentonite clay, more preferably a sodium bentonite clay.

For example, sodium bentonite (Cebogel) has a water absorption in the range of about 330 to about 400 wt. % and kaolin (speswhite) has a water absorption in the range of about 20 to about 30 wt. %, as determined by NEN-EN-ISO 10769:2011.

In a preferred embodiment, the water-absorbing filler comprises a filler that binds water by a chemical reaction, for example a cement. In a further preferred embodiment, the water-absorbing filler comprises a cement, preferably a hydraulic cement. A hydraulic cement is a cement that hardens due to reaction with water. Examples of a hydraulic cement are Portland cement and Portland cement blends (e.g. Portland blastfurnace cement or Portland flyash cement), supersulfated cements, calcium aluminate cements and calcium sulfoaluminate cements.

In another preferred embodiment, the water-absorbing filler comprises silicon dioxide. In a further preferred embodiment, the water-absorbing filler comprises both a filler that binds water by chemical reaction and silicon dioxide.

Preferably, the corrosion protecting composition according to the invention comprises the water-absorbing filler in an amount of about 20 to 80 wt. %, more preferably of about 22 to 60 wt. %, even more preferably of about 24 to 50 wt. % and most preferably of about 25 to 40 wt. %, all based on the total weight of the corrosion protecting composition.

Apart from the one or more water-absorbing fillers, the composition may optionally comprise one or more additional fillers, which may be of organic or inorganic nature. The one or more additional fillers may be present in an amount of 0 to about 60 wt. %, preferably about 8 to about 58 wt. %, more preferably about 16 to about 51 wt. % and most preferably in an amount of about 25 to about 45 wt. %, all based on the total weight of the corrosion protecting composition.

The total amount of filler present in the corrosion protecting composition, i.e. the total amount of the one or more water-absorbing filler plus the amount of the optional one or more additional fillers, is in the range of 20 to 80 wt. %, preferably 30 to 80 wt. %, more preferably 40 to 75 wt. % and most preferably 50 to 70 wt. %, all based on the total weight of the corrosion protecting composition.

Thus, the corrosion protecting composition according to the invention preferably comprises about 20 to about 80 wt. % of a water-absorbing filler and about 0 wt. % of an additional filler, more preferably about 22 to 60 wt. % of a water-absorbing filler and about 8 to about 58 wt. % of an additional filler, even more preferably about 24 to 50 wt. % of a water-absorbing filler and about 16 to about 51 wt. % of an additional filler, and most preferably about 25 to 60 wt. % of a water-absorbing filler and about 25 to about 45 wt. % of an additional filler, all based on the total weight of the corrosion protecting composition.

Fillers of an organic nature are for example cellulose, polystyrene, polyvinyl chloride, polyethene, polypropene, polyisoprene, rubber, polyamide and polyester. Of these examples, polyethene and polypropene may also be present in the amorphous polymer composition that is part of the corrosion protecting composition. When said polymers are applied as a filler material however, the requirements of e.g. glass transition temperature or molecular weight as specified for the amorphous polymer composition do not have to be met. As an example, syndiotactic polypropene with a glass transition temperature higher than −20° C. may be used as a filler.

Examples of inorganic fillers are inorganic minerals, salts and/or oxides, such as for example calcium carbonate, calcium sulphate, aluminium hydroxide, aluminium oxide, magnesium oxide, silicon dioxide, titanium dioxide, ground quartz, glass, talc, slate and kaolin.

Plasticizer

In a preferred embodiment, the corrosion protecting composition according to the invention further comprises a plasticizer (iii), which is preferably selected from the group consisting of a wax, petrolatum and a mixture thereof. The wax may be a petroleum derived wax, a plant or animal wax, or a synthetic wax such as for example a polyethylene wax or a Fischer-Tropsch wax. Waxes are well known in the art, and are for example disclosed in Kirk-Othmer, "Encyclopedia of Chemical Technology", 4th Ed. 1998, volume 25, p. 614-626.

In a preferred embodiment the wax comprises a petroleum wax. A petroleum wax is defined as any wax that is derived from petroleum. A significant fraction of petroleum consists of such waxes, which may be refined by vacuum distillation. Petroleum derived waxes are hydrocarbons, generally comprising a mixture of $C_{20}$-$C_{40}$ alkanes. Said waxes may comprise saturated n- and i-alkanes, cycloalkanes (naphthenes) and alkyl- and naphthene-substituted aromatic compounds.

Examples of a petroleum derived wax are paraffin wax, semi-microcrystalline wax and microcrystalline wax. A paraffin wax comprises mainly n-alkanes. A microcrystalline wax comprises, in addition to n-alkanes, substantial proportions of branched and cyclic saturated hydrocarbons. Semi-microcrystalline wax comprises more branched and cyclic compounds than paraffin wax, but less than microcrystalline wax. As is known to a person skilled in the art, the exact composition of a petroleum derived wax may depend largely on the composition of the petroleum from which it is derived. In a preferred embodiment, the composition comprises a microcrystalline wax.

In another preferred embodiment, the composition comprises petrolatum. Petrolatum is defined as a mixture of mainly hydrocarbons with a carbon number higher than 25, and is also known as petroleum jelly, paraffin jelly, white petrolatum, soft paraffin or vaseline. In another preferred embodiment, the composition comprises a mixture of a wax, preferably a microcrystalline wax, and petrolatum.

In a preferred embodiment the composition comprises about 1 to about 25 wt. % of the plasticizer (iii), more preferably about 1 to about 20 wt. %, even more preferably about 2 to about 15 wt. % and most preferably 3 to about 10 wt. %, based on the total weight of the composition.

Anti-Oxidant

According to a preferred embodiment, the corrosion protecting composition according to the invention further comprises an anti-oxidant (v). The anti-oxidant may be a primary anti-oxidant, a secondary anti-oxidant, a multifunctional anti-oxidant (i.e. an antioxidant combining primary and secondary antioxidant functions) or a lactone. The antioxidant may also comprise a combination of two or more antioxidants.

The optional one or more anti-oxidants may be present in an amount of about 0.05 to about 5 wt. %, preferably about 0.1 to about 4 wt. %, more preferably of about 0.2 to about 3 wt. % and most preferably about 0.3 to about 2 wt. %, all based on the total weight of the composition.

According to the present invention, the primary antioxidants are preferably selected from the group consisting of sterically hindered phenol compounds, sterically hindered alkylthiomethylphenol or arylthiomethylphenol compounds, and secondary aromatic amines. Such compounds are well known in the art and include the sterically hindered phenol compounds 2,6-di-t-butyl-4-methylphenol, Irganox® 1330, Irganox® 1010, Irganox® 1098, Irganox® 1076, Irganox® 245, Irganox® 259, Irganox® 1035, Irganox® 2246, Irganox® 3114 and Irganox® 3125, the sterically hindered alkylthiomethylphenol Irganox® 1520, i.e. 2,4-di-octylthiomethyl-6-methyl phenol, and the secondary aromatic based antioxidant comprising (polymerized) 1,2-dihydro-2,2,4-trimethylquinoline, such as for example Agerite® MA.

According to the present invention, the secondary antioxidants are preferably selected from the group consisting of phosphites and thio-esters. Suitable secondary antioxidants are for example Irgafos® 168, Irgafos® 12 and Irgafos® P-EPQ (all phosphites), and Lowinox® TBM-6, BNX® DLTDP (CAS No. 123-28-4) and Morstille 18 DSTDP (all thio-esters).

The multifunctional antioxidant preferably comprises both a primary and a secondary antioxidant function. Examples of multifunctional antioxidants are Irganox® L 115 and Irganox® 565.

An example of a lactone that can be used as antioxidant is Irganox® HP-136.

According to the present invention, the composition preferably comprises a primary antioxidant, wherein the primary anti-oxidant is preferably selected from the group of sterically hindered phenol compounds and secondary aromatic amines, most preferably from the group of sterically hindered phenol compounds.

According to the present invention, the composition preferably comprises a secondary antioxidant, wherein the secondary anti-oxidant is preferably selected from the group of phosphites.

According to a more preferred embodiment, the composition comprises a combination of a primary antioxidant and a secondary antioxidant, preferably a combination of a primary antioxidant and a secondary antioxidant which have a synergistic effect. A suitable combination is Irganox® 1010 and Irgafos® 168.

According to an even more preferred embodiment, the composition comprises a combination of a primary antioxidant, a secondary antioxidant and a lactone. In a further preferred embodiment the lactone is Irganox® HP-136.

Further examples of primary antioxidants, secondary antioxidants, multifunctional antioxidants and lactones are for example disclosed in WO 2005/005528, incorporated by reference.

Process

The invention also relates to a process for the protection against corrosion of an article, wherein a layer of a corrosion protecting composition according to the invention is applied to the surface of the article. The article is in a wet environment during the application of said layer of corrosion protecting composition.

Therefore, the invention relates to a process for the protection against corrosion of an article, comprising the steps of:

(a) application of a layer of a corrosion protecting composition comprising:

(i) an amorphous polymer composition comprising an amorphous polymer having a glass transition temperature of −20° C. or less, and
(ii) a water-absorbing filler,
on a surface of the article, and (b) application of a mechanical protective layer on top of said layer of said corrosion protecting composition, wherein the article is in a wet environment.

The corrosion protecting composition according to the invention is described in detail above.

The invention thus relates to a process for the protection of an article against corrosion, wherein the article is in a wet environment during step (a) of the process, i.e. during the application of said layer of said corrosion protecting composition to a surface of the article. The layer of the corrosion protecting composition may be applied to the whole surface of said article, or to a part of the surface.

Due to an improved setting of the corrosion protecting composition according to the invention on the article to be protected, including an improved deformity, a very good adhesive tack and a very good adhesive power to the surface of the article, the process can be performed while the article is in a wet environment, i.e. under water, in a splash zone, etc. According to "Corrosion Control of Steel-Fixed Offshore Platforms Associated with Petroleum Production," NACE Standard RP 0176-03, NACE International, Houston, 2003, incorporated by reference herein, a "splash zone" is defined as a zone (e.g. of an offshore platform) that is alternately in and out of the influence of tides, waves, winds and seas; excluded from this zone are surfaces that are wetted only during major storms.

The invention particularly relates to the protection of said article against corrosion. Consequently, it is preferred that the article is essentially made of metal, in particular steel, or concrete. Alternatively, the surface of the article is essentially made of metal, in particular steel, or concrete, whereas the interior of the article may comprise a different material. The process according to the invention is particularly suitable for the protection against corrosion of oil or gas lines or pipes and risers of oil drilling and production rigs or platforms. However, the process according to the invention also protects the article against mechanical external influences, such as for example vibrations and shocks, e.g. caused by wave action.

The article that is protected by the process according to the invention is in a wet environment, for example a marine environment. Herein, an article in a wet environment is defined as an article wherein a surface of the article, or part thereof, is wet or moist, i.e. water is present on a surface of the article or part thereof, or the surface of the article is situated under water.

The article may for example be wholly or partly submerged in water, e.g. a submerged oil or gas pipeline, a riser of a drilling or production rig or platform, or an article situated in the so called splash zone that is situated (partly) above water but may be wet due to wave or tide action, etc. In one embodiment of the process according to the invention, the article in a wet environment is a submerged article, such as for example an oil or gas pipe or line that is located under water. In another embodiment of the invention, the article in a wet environment is a partly submerged article, such as for example a riser of an oil drilling or production rig or platform that is located at sea, or an oil pipe or line that is partly located under water. In another embodiment of the invention, the article in a wet environment is an article that is situated in a splash zone.

Alternatively, the article may be in a wet environment due to condensation of water from the environment on a surface of the article, resulting in the presence of water on a surface of the article or part thereof. An example of such an article is a sweating pipeline, i.e. a pipeline on the surface whereof water is present due to condensation from the environment, or a gutter. In another embodiment of the process according to the invention, the article in a wet environment is a sweating pipeline or a gutter.

The first step (a) of the process according to the invention comprises the application of a layer of a corrosion protecting composition according to the invention on a surface of the article, wherein the article is in a wet environment. In other words, the layer of said corrosion protecting composition is applied to said surface while the surface or part thereof is wet or moist, i.e. water is present on a surface of the article or part thereof, during the execution of step (a) of the process.

In contrast to processes known from prior art, the corrosion protecting composition according to the invention can be applied directly on to the wet surface of the article.

The process according to the invention may therefore be executed on the article when the article is actually situated in the wet environment, without the need to isolate the article from said wet environment. The process may even be executed under water, in order to protect a submerged article. Drying of the surface of the article prior to application of the composition according to the invention in step (a) of the process is not necessary. In addition, extensive pretreatment of the surface of the article is generally not necessary in the process according to the invention.

For example when a submerged article is to be protected, in processes known in the art it is often necessary to build a casing around the article and remove the water that is present in the casing. Subsequently, the surface of the article often has to undergo a thorough pretreatment, e.g. by sand blasting, in order to prepare the surface of the article. These time-consuming and expensive steps are not necessary in the process according to the invention, which requires minimal or no surface pretreatment.

The second step (b) of the process according to the invention comprises the application of a compressing and flexible mechanical protective layer. The mechanical protective layer is applied on top of the layer of the corrosion protecting composition according to the invention, and covers said layer completely. Application of the mechanical protective layer "on top of" the layer of the corrosion protecting composition means that the mechanical protective layer is situated on the side of the layer of the corrosion protecting composition that is opposite from the side of said layer of corrosion protecting composition that is in contact with the surface of the article to be protected. In one embodiment, the mechanical protective layer is in direct contact with the layer of the corrosion protecting composition. In another embodiment, additional intermittent layers may be present in between the layer of the corrosion protecting composition and the mechanical protective layer. The function of the mechanical protective layer is to protect the layer of the composition according to the invention that is applied in step (a) of the process. In addition, said mechanical protective layer serves to minimize voids eventually present underneath the corrosion preventing layer, enables the self healing effect by generating pre-stress to the material and prevents the corrosion protecting composition from excessive exposure to water which may over time result in a deterioration of the composition.

The term "mechanical protective layer" refers to a layer that protects the underlying layer or layers mechanically from external effects. The mechanical protective layer may for example be applied in the form of a tape. Examples of mechanical protective layers include polymer (multilayer) films comprising e.g. polyethene, polypropene, polyvinyl chloride, polyesters, epoxies, polyurethane or aramide. In addition, the polymer films may be laminated with reinforcing fibres, such as for example glass fibres or carbon fibres. Suitable protective layers are for example provided by high shear tapes. High shear tapes are well known in the art, and are for example disclosed in U.S. Pat. No. 5,817,413 and U.S. Pat. No. 6,033,776, both incorporated by reference.

If a mechanical protective layer is applied with stress to a substrate comprising a protective layer of the composition according to the invention, or if the mechanical protective layer shrinks around the substrate, e.g. a pipe, a self-repairing effect may be obtained whereby defects in the protective layer are repaired in the course of time. The protective layer then exerts continuous stress on the layer of the composition according to the invention. If the protective layer sustains a minor damage, this stress ensures a flow of the composition according to the invention towards the damaged site, resulting in the covering of any exposed surface of the underlying substrate.

An example of a suitable mechanical protective layer is a glass fiber reinforced polyurea layer. Such a protective layer serves as a rigid mechanical reinforcement of the layer of corrosion protecting composition, protecting said layer against impacts and indentations from for example driftwood, boat landings, etc. In a preferred embodiment, a watertight layer is applied over said mechanical protective layer. In another preferred embodiment, said mechanical protective layer is itself a watertight layer. In another preferred embodiment, two different layers are applied on top of the layer of corrosion protecting composition, wherein the first layer, i.e. a layer in direct contact with the layer of corrosion protecting composition, is a flexible tape and the second layer, i.e. a layer that is in direct contact with said flexible tape, is an additional rigid mechanical layer, for example of glass fibre reinforced polyurea.

Step (a) of the process according to the invention may also be performed by the application of a tape to the surface of the article, the tape comprising a layer of the corrosion protecting composition according to the invention.

Therefore, the invention further relates to a process according to the invention, wherein in step (a) a tape is applied on the surface of the article, wherein the tape comprises a layer comprising a corrosion protecting composition according to the invention comprising (i) an amorphous polymer composition comprising an amorphous polymer having a glass transition temperature of −20° C. or less and (ii) a water-absorbing filler. The corrosion protecting composition according to the invention is described in detail above.

The mechanical protective layer for the protection of the layer of the composition according to the invention may be comprised in the tape. In that case step (b) of the process according to the invention is also executed by the application of said tape on the surface of the article, thus step (a) and step (b) of the process according to the invention are in that case executed simultaneously.

Tape

The invention also relates to a tape for the protection of an article against corrosion, wherein the tape comprises a layer comprising a corrosion protecting composition according to the invention. The corrosion protecting composition is disclosed in detail above. The invention therefore relates to a tape comprising a layer comprising a corrosion protecting composition comprising:

(i) an amorphous polymer composition comprising an amorphous polymer having a glass transition temperature of −20° C. or less, and (ii) a water-absorbing filler.

In a preferred embodiment of the tape according to the invention, the amorphous polymer is selected from the group consisting of:

(a) a polymer comprising about 50.0% to about 98% by weight of isobutene and about 2% to about 50.0% of a $C_2$-$C_{12}$ alkene other than isobutene, a $C_4$-$C_{12}$ alkadiene, or a mixture thereof, based on the total weight of the polymer;

(b) a polymer comprising more than about 98% to about 100% by weight of isobutene, based on the total weight of the polymer;

(c) a polymer comprising about 50.0% to about 99.9% by weight of propene and about 0.1% to about 50.0% of a $C_2$-$C_{12}$ alkene other than propene, a $C_4$-$C_{12}$ alkadiene, or a mixture thereof, or about 100 wt. % propene, based on the total weight of the polymer;

(d) a polymer comprising about 0.1% to about 50.0% by weight of ethene and about 50.0% to about 99.9% of a $C_2$-$C_{12}$ alkene other than ethene, a $C_4$-$C_{12}$ alkadiene, or a mixture thereof, based on the total weight of the polymer;

(e) a polymer comprising about 0.1% to about 50.0% by weight of 2-methyl-1-pentene and about 50.0% to about 99.9% of a $C_2$-$C_{12}$ alkene other than 2-methyl-1-pentene, a $C_4$-$C_{12}$ alkadiene, or a mixture thereof, or about 100 wt. % 2-methyl-1-pentene, based on the total weight of the polymer; and (f) mixtures of (a), (b), (c), (d) and/or (e).

In another preferred embodiment of the tape according to the invention, the amorphous polymer is selected from the group consisting of (a) and (b), and a mixture thereof.

In another preferred embodiment of the tape according to the invention, the amorphous polymer has a number average molecular weight $M_n$ in the range of 1,000 to 150,000 g/mol.

In another preferred embodiment of the tape according to the invention, said corrosion protecting composition further comprises (iii) a plasticizer selected from the group consisting of a wax, petrolatum and a mixture thereof.

The tape can be applied to the article to be protected while the article is in a wet environment. In other words, the tape can be applied to a surface of the article while the surface or part thereof is wet or moist, i.e. water is present on a surface of the article or part thereof, during application of the tape. Drying the surface of the article prior to application of the tape is not necessary, i.e. the tape can directly be applied to a (partly) submerged article, to an article in a splash zone or to an article that has a wet surface due to for example condensation of moisture on the surface of the article, such as a sweating pipeline. The surface of the article to be protected generally does not need extensive pretreatment. The tape can be easily applied to the article to be protected against corrosion since the layer of the composition according to the invention can easily be deformed. Moreover after being applied, the tape can also easily be removed. Although due to cohesive breakage it does leave some residuals on the surface of the metal article, these residuals can be easily removed by scraping. Furthermore, the tape according to the invention can suitably be used for repairing damaged or corroded metal articles that were already provided with some protecting material according to the state of the art, provided that the surface of the metal article is cleaned to a St-2 level according to the ISO standard 8501-1. Finally, as described above, the tape has self-repairing properties due to the fluid and/or visco-elastic nature of the layer of the corrosion protecting composition according to the invention.

Preferably, the tape comprises a further layer (b) to protect layer (a). Especially when transported such a protecting layer (b) enables that the tape can easily be winded on a bobbin or spool or other suitable means, and prevents inter-adhesion of the layers of the tape.

The invention therefore also relates to a tape comprising:

(a) a first layer comprising a corrosion protecting composition comprising:

(i) an amorphous polymer composition comprising an amorphous polymer having a glass transition temperature of −20° C. or less, and (ii) a water-absorbing filler; and (b) a second layer to protect layer (a).

Layer (b) may for example have the function of a release liner, which is removed from the tape during application of the tape. Layer (b) may then comprise any suitable material for a release liner, e.g. paper, an $C_2$-$C_{20}$ alkene polymer or copolymer, etc.

Alternatively, layer (b) may for example comprise a polyvinyl chloride film having a siliconized outer surface. When such a layer (b) is present, the presence of an additional release liner is not necessary. In addition, said layer also serves as a separation layer in order to increase easy of application and as a layer to enable proper adhesion of a subsequently applied mechanical protective layer.

In a specific embodiment, the tape comprises a further layer (c), wherein layer (c) preferably comprises a film comprising a polymer or a copolymer of one or more $C_2$-$C_{20}$α-alkenes and/or alkadienes, a polyvinyl chloride (PVC), a polyurethane, or a non-woven polyester cloth, as is described in more detail below.

Layer (c), if present, is situated on the other side of layer (a) than the side where layer (b) is situated. In other words, the order of the layers in the tape is then (b)-(a)-(c), wherein layer (a) is positioned in between (b) and (c). The invention thus also relates to a tape comprising:

(a) a first layer comprising a corrosion protecting composition comprising:

(i) an amorphous polymer composition comprising an amorphous polymer having a glass transition temperature of −20° C. or less, and (ii) a water-absorbing filler, (b) a second layer to protect layer (a); and (c) a layer comprising a film comprising a polymer or a copolymer of one or more $C_2$-$C_{20}$α-alkenes and/or alkadienes, a polyvinyl chloride (PVC), a polyurethane, or a non-woven polyester cloth.

Layer (c) serves as a separation layer in order to increase ease of application, but also as a layer to enable proper adhesion of a subsequently applied mechanical protective layer.

Moreover, the tape preferably has, embedded in layer (a), a component (d) comprising a reinforcing net-like structure having a woven, knitted or spool-knitted structure, that can preferably be deformed in two orthogonal directions. The reinforcing net-like structure can for example be manufactured from polyester, or from polyolefin fibres, e.g. fibres made from ethane homopolymers or copolymers or propene homopolymers or copolymers, as is well known in the art. The invention thus also relates to a tape comprising:

(a) a first layer comprising a corrosion protecting composition comprising:

(i) an amorphous polymer composition comprising an amorphous polymer having a glass transition temperature of −20° C. or less, and
(ii) a water-absorbing filler;
(b) a second layer to protect layer (a);
(c) optionally, a layer comprising a film comprising a polymer or a copolymer of one or more $C_2$-$C_{20}$α-alkene and/or dialkenes, a polyvinyl chloride (PVC), a polyurethane, or a non-woven polyester cloth; and
(d) a reinforcing net-like structure, embedded in layer (a).

In said tape the layers thus are situated in the order (b)–[(a)+(d)]. If said layer (c) is present, the order of the layers in the tape is thus (b)–[(a)+(d)]–(c).

Layer (c) of the tape preferably comprises a film comprising a polymer or a copolymer of one or more $C_2$-$C_{20}$α-alkene and/or dialkenes, a polyvinyl chloride (PVC), a polyurethane, or a non-woven polyester cloth. Examples of such polymers and copolymers are EP(D)M elastomers, ethylene homopolymers, ethylene-α-alkene copolymers, propylene homopolymers and propylene-α-alkene copolymers, in particular propylene-ethylene copolymers which may contain high amounts of propylene, e.g. more than 80 wt. %, based on the total weight of the copolymer, or low amounts of propylene, e.g. less than 20 wt. %, based on the total weight of the copolymer. If the copolymer is an ethylene copolymer which is a preferred embodiment of the invention, the $C_2$-$C_{20}$α-alkene is then preferably a $C_3$-$C_{12}$α-alkene, in particular a $C_3$-$C_8$α-alkene. Examples of suitable α-alkenes are propene, 1-butene, 1-hexene and 1-octene. The ethylene copolymers preferably comprise 0.1 to 30 wt. %, in particular 0.1 to 20 wt. % α-alkene. The density of the ethylene homopolymers or copolymers (as measured according to ASTM D 1248) is preferably 0.800-0.975 g/cm$^3$, in particular 0.850-0.950 g/cm$^3$. The melt index (as measured according to ASTM D 1238) of the ethylene homopolymers or copolymers is preferably 0.1 to 50 g/min, in particular 0.2 to 20 g/min. Layer (c) of the tape comprises preferably one or more of the following polymers: low density polyethylene (LDPE), linear low density polyethylene (LLDPE), high density polyethylene (HDPE), an ethene propene copolymer, an ethene propene diene copolymer. According to a preferred embodiment of the invention, layer (c) of the tape comprises LDPE, HDPE or LLDPE or a combination thereof. It is furthermore preferred that the materials employed for layer (c) are manufactured in a metallocene catalyzed polymerization process.

Obviously, layer (c) may comprise more than one layer and can for example be a multilayer film comprising of LLDPE outer layers and a HDPE inner layer. Such multilayer films are well known in the art.

Layer (c) may further comprise different additives such as pigments and fillers.

The tape according to the invention has preferably a total thickness of about 1 to about 20 mm, more preferably of about 1 to about 15 mm, even more preferably of about 1 to about 10 mm and most preferably of about 1 to about 7 mm. The width of the tape can obviously be adjusted as desired or as suitable, but is preferably about 2.0 to about 100.0 cm, more preferably about 2.5 to about 75.0 cm, even more preferably about 3.0 to about 70.0 cm, even more preferably about 4.0 to about 65.0 cm and most preferably about 5.0 to about 60.0 cm. The length of the tape can obviously also be adjusted as desired or as suitable. A tape with a length of for example several meters may be wound around a bobbin or spool prior to use. However, the tape may also be in the form of a sheet. The length and width of said sheet can obviously be adjusted as desired or as suitable.

The thickness of layer (c) is preferably about 10 μm to about 500 μm, more preferably about 20 μm to about 300 μm.

The invention also relates to a process for the protection against corrosion of an article comprising the step of applying a tape according to the invention to the surface of the article, wherein the article is in a wet environment. The tapes according to the invention are described in detail above.

In addition, the invention relates to a process for the manufacture of a tape for the protection of an article against corrosion, wherein a composition according to the invention as defined above is laminated onto a film, said film preferably comprising a polymer or a copolymer of one or more $C_2$-$C_{20}$α-alkene and/or alkadienes, a polyvinyl chloride (PVC), a polyurethane, or a non-woven polyester cloth as defined above for layer (c) of the tape.

After said lamination step, the surface of layer (a) not being in contact with layer (c) is preferably protected by a layer (b), wherein layer (b) may be any suitable material that comprises e.g. an alkene polymer or copolymer, paper and the like.

Optionally, a component (d) is present embedded in layer (a) as described above

After the tape is manufactured, it is preferably wrapped around a bobbin or a spool or a similar suitable means so that it can easily be transported to the area or location where it must be used.

Finally, the inventors have noted that with tapes known in the art corrosion occurs in the areas of overlap between different windings ("spiral corrosion") due to the fact that in the areas of overlap the rather stiff windings are not in intimate contact so that occlusion of water occurs. Such problems do, however, not occur with the tape according to the invention because of the fluid and/or visco-elastic nature of layer (a).

Protected Article

The invention further relates to an article, obtainable by the process according to the invention. Therefore, the invention also relates to an article, comprising:
(a) a layer of a corrosion protecting composition comprising:
(i) an amorphous polymer composition comprising an amorphous polymer having a glass transition temperature of −20° C. or less, and
(ii) a water-absorbing filler,
on a surface of the article, and
(b) a mechanical protective layer to protect said layer of said composition.

The corrosion protecting composition is disclosed in detail above.

The article may optionally comprise additional layers. In a preferred embodiment, the article further comprises a watertight layer. In another preferred embodiment the mechanical protective layer (b) itself is watertight.

The mechanical protective layer (b) is applied on top of the layer of the corrosion protecting layer (a), covering it completely. Suitable protecting layers are for example provided by high shear tapes which are well known in the art. High shear tapes are for example disclosed in U.S. Pat. No. 5,817,413 and U.S. Pat. No. 6,033,776, both incorporated by reference.

The layer of the corrosion protecting composition according to the invention may be comprised in a tape according to the invention. The mechanical protective layer (b) may have been applied separately to the article, or alternatively, the mechanical protective layer (b) may also be comprised in said tape. The invention also relates to an article, comprising a tape according to the invention. In said article, the surface of the article is covered by said tape. Said tapes are described in detail above.

In a preferred embodiment, the article is essentially made of metal, in particular steel, or concrete. Alternatively, the surface of the article is essentially made of metal, in particular steel, or concrete, whereas the interior of the article may comprise a different material. The article may for example be a tubular article such as for example a gas or oil pipe or line. The article may also be a riser of an oil drilling or production rig or platform, a piller foundation or pier of e.g. a bridge, a buttress foundation of a dam, a concrete wall, etc.

EXAMPLES

Compositions

Several compositions according to the invention (see Table 1) were prepared by mixing the components in a paddle mixer at 90° C.

TABLE 1

Corrosion protecting compositions

| Composition | A | B | C |
|---|---|---|---|
| Oppanol B10 | 25.0 | 31.0 | 37.5 |
| Sodium bentonite | 25.3 | 31.0 | 49.6 |
| Microwax | 6.0 | — | 5.0 |
| Petrolatum | 12.0 | 12.4 | 7.5 |
| CaCO$_3$ | 24.3 | 16.5 | — |
| Aerosil | — | 1.45 | — |
| Portland cement | 7.0 | 7.1 | — |
| Irgafos 168 | 0.20 | 0.19 | 0.20 |
| Irganox 1010 | 0.20 | 0.19 | 0.20 |

Adhesion

Adhesion was tested according to peel-strength test as described in ISO 21809-3 (2008) annex D. Requirements of ISO 21809-3 Amendment 1 table 41 were used. Peel strength was measured and after this the test specimens were inspected for occurrence of cohesive fracture (desired property), absence of adhesive failure and remaining film on the substrate. The results are summarized in Table 2.

Cathodic Disbondment

Cathodic disbondment (CD) was tested according to ISO 21809-3 (2008) annex F. Requirements of ISO 21809-3 Amendment 1 table 41 were used. The results are summarized in Table 2.

Drip Resistance

Drip resistance test was tested according to ISO 201809-3 (2008) annex J at various increasing temperatures. The results are summarized in Table 2.

TABLE 2

Adhesion, cathodic disbondment and drip resistance.

| Composition | A | B | C |
|---|---|---|---|
| Adhesion | | | |
| Peel strength max. (N/mm) | 0.10 | 0.08 | 0.35 |
| Failure mechanism | Cohesive | Cohesive | Cohesive |
| Film left on substrate | Yes | Yes | Yes |
| CD test | | | |
| Disbondment (mm) | 20 | 0 | 11 |
| Self-healing | no | yes | no |
| Drip resistance (° C.) | 80 | 80 | 65 |

The results shown in Table 2 show that the corrosion protecting compositions according to the invention show a good adhesion and a good drip resistance.

Water-Absorption of the Corrosion Protecting Composition

The water-absorption of the corrosion protecting composition is determined using the procedure according to ASTM D570, adapted for the corrosion protecting composition according to the invention.

A plastic cup having a known depth in the range of 15 to 25 mm and a surface with a known diameter (round surface) or a known length and width (rectangular or square surface) in the range of 30 to 50 mm is weighed (mass A). Herein, a cup having a depth of 20 mm and a round surface with a diameter of 44 mm was used. Said cup is filled completely with the corrosion protecting composition, avoiding air entrapments. The surface is smoothed using a putty knife. The cup filled with corrosion protecting composition is weighed (mass B).

Subsequently, the filled cup is placed in a container of distilled water maintained at a temperature of 23±1° C. The filled cup should be completely submerged. The container comprising the cup is then placed in a climate cabinet and the water temperature is maintained at 23±1° C. for 72 hours. After 72 hours of immersion the cup is taken out of the container, its surfaces are dried with tissue paper and the dried cup is weighed (mass C).

The water-absorption, expressed in wt. %, is calculated as followed:

$$w_A = \frac{[(C-A)-(B-A)]}{(B-A)} *100\%$$

The water-absorption (g/m$^2$) is calculated as followed:

$$w_A(g/m^2) = \frac{[(C-A)-(B-A)]}{\text{surface of cup}} *100\%$$

As is known to a person skilled in the art, the method to calculate the surface of said cup depends on the shape of the surface. A circular surface equals πr$^2$, wherein r is the radius of the circle, and a square or rectangular surface equals l*w, wherein l is the length and w is the width of the surface.

As long as the depth of the cup used to determine the water-absorption (g/m$^2$) is larger than the minimum depth as described above, the water-absorption (g/m$^2$) thus determined will be independent of the mass (B-A) of the corrosion protecting composition that was employed in the determination of the water-absorption (g/m$^2$).

The water absorption (g/m$^2$), w$_A$ (g/m$^2$), of a composition according to the invention, comprising 30.8 wt. % of a polyisobutene, 25.3 wt. % of a water-absorbing filler (sodium bentonite, Cebogel Premium), 4.9 wt. % petrolatum (Vara 4800), 1.5 wt. % Aerosil, 30.5 wt. % ground quartz (silica flour), 3.1 wt. % Portlandhuttencement CEMII/S 32.5 R, 2.9 wt. % of a surfactant (Dmex), 0.50 wt. % of an anti-oxidant (0.25% Irgafos 168 and 0.25% Irganox 1010) and 0.31 wt. % of a pigment (Pigment green) was determined according to the procedure described above. The water-absorption (g/m$^2$) of this composition as determined after 72 hours immersion in distilled water at 23±1° C. was 2354 g/m$^2$.

The invention claimed is:
1. A composition, comprising:
   (a) an amorphous polymer composition comprising an amorphous polymer having a glass transition temperature of −20° C. or less, and
   (b) a water-absorbing filler having a water-absorption of about 20 wt. % or higher as determined according to the procedure described in standard NEN-EN-ISO 10769:2011, wherein the water-absorbing filler comprises a filler that binds water by a chemical reaction,
   wherein the composition comprises 20 to 80 wt. % of the amorphous polymer composition, based on the total weight of the composition, and wherein the amorphous polymer has a number average molecular weight M$_n$ in the range of 1,000 to 150,000 g mol$^{-1}$,
   wherein the composition is suitable for protection against corrosion of an article in a wet environment wherein water is present on a surface of the article or part thereof, or wherein the surface of the article is situated under water.

2. The composition according to claim 1, wherein the amorphous polymer is selected from the group consisting of:
   (a) a polymer comprising about 50.0% to about 98% by weight of isobutene and about 2% to about 50.0% of a C$_2$-C$_{12}$ alkene other than isobutene, a C$_4$-C$_{12}$ alkadiene, or a mixture thereof, based on the total weight of the polymer;
   (b) a polymer comprising more than about 98% to about 100% by weight of isobutene, based on the total weight of the polymer;
   (c) a polymer comprising about 50.0% to about 99.9% by weight of propene and about 0.1% to about 50.0% of a C$_2$-C$_{12}$ alkene other than propene, a C$_4$-C$_{12}$ alkadiene, or a mixture thereof, or about 100 wt. % propene, based on the total weight of the polymer;
   (d) a polymer comprising about 0.1% to about 50.0% by weight of ethene and about 50.0% to about 99.9% of a C$_2$-C$_{12}$ alkene other than ethene, a C$_4$-C$_{12}$ alkadiene, or a mixture thereof, based on the total weight of the polymer;
   (e) a polymer comprising about 0.1% to about 50.0% by weight of 2-methyl-1-pentene and about 50.0% to about 99.9% of a C$_2$-C$_{12}$ alkene other than 2-methyl-1-pentene, a C$_4$-C$_{12}$ alkadiene, or a mixture thereof, or about 100 wt. % 2-methyl-1-pentene, based on the total weight of the polymer; and
   (f) mixtures of (a), (b), (c), (d) and/or (e).

3. The composition according to claim 1, wherein the amorphous polymer is selected from the group consisting of:
   (a) a polymer comprising about 50.0% to about 98% by weight of isobutene and about 2% to about 50.0% of a C$_2$-C$_{12}$ alkene other than isobutene, a C$_4$-C$_{12}$ alkadiene, or a mixture thereof, based on the total weight of the polymer;
   (b) a polymer comprising more than about 98% to about 100% by weight of isobutene, based on the total weight of the polymer; and
   (c) mixtures thereof.

4. The composition according to claim 1, wherein the composition further comprises (c) a plasticizer selected from the group consisting of a wax, petrolatum and a mixture thereof.

5. The composition according to claim 1, wherein the water-absorbing filler comprises a clay mineral.

6. The composition according to claim 1, wherein the filler that binds water by a chemical reaction is a cement.

7. The composition according to claim 1, having a water-absorption (g/m$^2$), w$_A$ (g/m$^2$), of about 600 g/m$^2$ or higher, wherein w$_A$ (g/m$^2$) is determined by:
   (1) weighing a cup having a known depth in the range of 15 to 25 mm and a surface with a known diameter (round surface) or a known length and width (rectangular or square surface) in the range of 30 to 50 mm, to obtain mass A;
   (2) filling the plastic cup completely with said composition, avoiding air entrapments, and smoothing the surface;
   (3) weighing the filled cup to obtain mass B;
   (4) placing the filled cup in a container of distilled water maintained at a temperature of 23±1° C., completely submerging the cup;
   (5) placing the cup in a climate cabinet and maintaining the water temperature at 23±1° C. for 72 hours;
   (6) taking the cup out of the container after 72 hours, drying its surfaces and weighing the dried cup to obtain mass C; and
   (7) calculating the water-absorption (g/m$^2$), expressed in g/m$^2$, as follows:

$$w_A\left(\frac{g}{m^2}\right) = \frac{[(C-A)-(B-A)]}{\text{surface of cup}} * 100\%.$$

8. The composition according to claim 7, wherein the water-absorbing filler comprises a clay mineral selected from the group consisting of a bentonite clay, a montmorillonite clay, a combination of two or more bentonite clays, a combination of two or more montmorillonite clays and a combination of one or more bentonite clay and one or more montmorillonite clay.

9. A tape comprising a layer of a corrosion protecting composition according to claim 1.

10. An article, comprising:
    (a) a layer of a corrosion protecting composition according to claim 1, comprising:
       (i) an amorphous polymer composition comprising an amorphous polymer having a glass transition temperature of −20° C. or less, and
       (ii) a water-absorbing filler,
    on a surface of the article, and
    (b) a mechanical protective layer to protect the layer of the corrosion protecting composition.

11. A process for protecting against corrosion of an article, comprising:
    (a) applying a layer of a corrosion protecting composition comprising:
       (i) an amorphous polymer composition comprising an amorphous polymer having a glass transition temperature of −20° C. or less, and
       (ii) a water-absorbing filler having a water-absorption of about 20 wt. % or higher, determined according to the procedure described in standard NEN-EN-ISO 10769:2011, wherein the water-absorbing filler comprises a filler that binds water by a chemical reaction, wherein the composition comprises 20 to 80 wt. % of the amorphous polymer composition, based on the total weight of the composition, and wherein the amorphous polymer has a number average molecular weight $M_n$ in the range of 1,000 to 150,000 g mol$^{-1}$, on a surface of the article, and
(b) application of a mechanical protective layer on top of the layer of said corrosion protecting composition, wherein the article is in a wet environment wherein water is present on a surface of the article or part thereof, or the surface of the article is situated under water.

12. The process according to claim 11, wherein the amorphous polymer has a number average molecular weight Mn in the range of 1,000 to 150,000 g/mol.

13. The process according to claim 11, wherein the layer is applied in the form of a tape.

14. The process according to claim 11, wherein the corrosion protecting composition further comprises (iii) a plasticizer selected from the group consisting of a wax, petrolatum and a mixture thereof.

15. The process according to claim 11, wherein the filler that binds water by a chemical reaction is a cement.

16. A process according to claim 11, wherein the amorphous polymer is selected from the group consisting of:
(a) a polymer comprising about 50.0% to about 98% by weight of isobutene and about 2% to about 50.0% of a $C_2$-$C_{12}$ alkene other than isobutene, a $C_4$-$C_{12}$ alkadiene, or a mixture thereof, based on the total weight of the polymer;
(b) a polymer comprising more than about 98% to about 100% by weight of isobutene, based on the total weight of the polymer;
(c) a polymer comprising about 50.0% to about 99.9% by weight of propene and about 0.1% to about 50.0% of a $C_2$-$C_{12}$ alkene other than propene, a $C_4$-$C_{12}$ alkadiene, or a mixture thereof, or about 100 wt. % propene, based on the total weight of the polymer;
(d) a polymer comprising about 0.1% to about 50.0% by weight of ethene and about 50.0% to about 99.9% of a $C_2$-$C_{12}$ alkene other than ethene, a $C_4$-$C_{12}$ alkadiene, or a mixture thereof, based on the total weight of the polymer;
(e) a polymer comprising about 0.1% to about 50.0% by weight of 2-methyl-1-pentene and about 50.0% to about 99.9% of a $C_2$-$C_{12}$ alkene other than 2-methyl-1-pentene, a $C_4$-$C_{12}$ alkadiene, or a mixture thereof, or about 100 wt. % 2-methyl-1-pentene, based on the total weight of the polymer; and
(f) mixtures of (a), (b), (c), (d) and/or (e).

17. The process according claim 16, wherein the amorphous polymer is selected from the group consisting of:
(a) a polymer comprising about 50.0% to about 98% by weight of isobutene and about 2% to about 50.0% of a $C_2$-$C_{12}$ alkene other than isobutene, a $C_4$-$C_{12}$ alkadiene, or a mixture thereof, based on the total weight of the polymer;
(b) a polymer comprising more than about 98% to about 100% by weight of isobutene, based on the total weight of the polymer; and
(c) mixtures thereof.

18. The process according to claim 11, wherein the water-absorbing filler comprises a clay mineral.

19. The process according to claim 18, wherein the water-absorbing filler comprises a clay mineral selected from the group consisting of a bentonite clay, a montmorillonite clay, a combination of two or more bentonite clays, a combination of two or more montmorillonite clays and a combination of one or more bentonite clay and one or more montmorillonite clay.

* * * * *